(12) United States Patent
Gerstel et al.

(10) Patent No.: US 7,715,715 B2
(45) Date of Patent: May 11, 2010

(54) SHARED OPTICAL RING PROTECTION IN A MULTI-FIBER RING

(75) Inventors: Ornan A. Gerstel, Cupertino, CA (US); John C. Carrick, Wakefield, MA (US)

(73) Assignee: Tellabs Operations, Inc., Naperville, IL (US)

( * ) Notice: Subject to any disclaimer, the term of this patent is extended or adjusted under 35 U.S.C. 154(b) by 1120 days.

(21) Appl. No.: 09/886,153

(22) Filed: Jun. 22, 2001

(65) Prior Publication Data
US 2002/0071154 A1 Jun. 13, 2002

Related U.S. Application Data

(60) Provisional application No. 60/213,171, filed on Jun. 22, 2000.

(51) Int. Cl.
*H04B 10/00* (2006.01)
(52) U.S. Cl. .............................. 398/59; 398/48; 398/83
(58) Field of Classification Search ............. 398/82–88, 398/58–59
See application file for complete search history.

(56) References Cited

U.S. PATENT DOCUMENTS

| | | | | |
|---|---|---|---|---|
| 4,633,246 | A | 12/1986 | Jones et al. ............ | 340/825.05 |
| 5,159,595 | A | 10/1992 | Flanagan et al. ......... | 370/85.15 |
| 5,333,130 | A | 7/1994 | Weissmann et al. ........... | 370/16 |
| 5,341,364 | A | 8/1994 | Marra et al. ............... | 370/16.1 |
| 5,406,401 | A | 4/1995 | Kremer ...................... | 359/110 |
| 5,412,652 | A | 5/1995 | Lu .......................... | 370/85.12 |
| 5,442,620 | A | 8/1995 | Kremer ..................... | 370/16.1 |
| 5,475,676 | A | 12/1995 | Takatori et al. ........... | 370/16.1 |

(Continued)

FOREIGN PATENT DOCUMENTS

EP     0 903 882 A2     3/1999

(Continued)

OTHER PUBLICATIONS

Ornan Gerstel, et al., "Optical Layer Survivability—An Implementation Perspective", IEEE Journal on Selected Areas in Communications, vol. 18, No. 10, pp. 1885-1899, Oct. 2000.

(Continued)

*Primary Examiner*—Agustin Bello
(74) *Attorney, Agent, or Firm*—Fitzpatrick, Cella, Harper & Scinto

(57) ABSTRACT

A communication network comprising first and second communication paths, and nodes coupled therethrough. Each node comprises first and second switches, each having a first terminal coupled to an end of a first communication path, and a second terminal coupled to an end of a second communication path. Third terminals of the first and second switches are coupled together through at least one third communication path. A Wavelength-Division-Multiplexed device of the node is coupled to an external communication node and a fourth terminal of each switch. A node controller responds to an applied input by controlling at least one switch to cause selective coupling of at least one of (a) first and second nodes together via at least one of the paths, and (b) the external communication node and at least one of the first and second nodes via at least one of the paths.

49 Claims, 11 Drawing Sheets

U.S. PATENT DOCUMENTS

| | | | |
|---|---|---|---|
| 5,680,235 A | 10/1997 | Johansson | 359/110 |
| 5,986,783 A * | 11/1999 | Sharma et al. | 398/59 |
| 6,025,941 A | 2/2000 | Srivastava et al. | 359/119 |
| 6,084,694 A | 7/2000 | Milton et al. | 359/124 |
| 6,477,288 B1 * | 11/2002 | Sato | 385/16 |

FOREIGN PATENT DOCUMENTS

| | | |
|---|---|---|
| EP | 0 920 153 A2 | 6/1999 |
| EP | 0 928 082 A1 | 7/1999 |
| EP | 0 948 153 A2 | 10/1999 |
| JP | 63-161748 | 7/1888 |
| JP | 53-68046 | 6/1978 |
| JP | 3-107242 | 5/1991 |

OTHER PUBLICATIONS

N. Nagatsu et al., *Flexible OADM Architecture and Its Impact on WDM Ring Evolution for Robust and Large-Scale Optical Transport Networks*, IEICE Transactions on Electronics, Institute of Electronics Information and Comm. Eng. Tokyo, Japan, vol. E82-C, No. 8 (Aug. 1999) pp. 1371-1379.

J. L. Zyskind et al., *Fast Link Control Protection for Surviving Channels in Multiwavelength Optical Networks*, 22$^{nd}$ European Conference on Optical Communication—ECOC 1996, Oslo (5 pages).

* cited by examiner

SHARED OPTICAL RING PROTECTION IN A MULTI-FIBER RING

Priority is herewith claimed under 35 U.S.C. §119(e) from copending Provisional Patent Application Ser. No. 60/213,171, filed Jun. 22, 2000. The disclosure of that Provisional Patent Application is incorporated by reference herein in its entirety.

BACKGROUND OF THE INVENTION

1. Field of the Invention

This invention relates generally to optical communications networks, and, in particular, to a failure tolerant Wavelength-Division Multiplexed (WDM) optical ring communications network.

2. Background of the Invention

It is known to provide protection in ring communication networks against line failures and the like by equipping such networks with bypass equipment for bypassing failed components and routing signals to their intended destinations. For example, some known four-fiber ring networks employ two "working" transmission paths to normally forward communications being exchanged between communication terminals of the network, and two "protection" paths to forward those communications in the event that a failure occurs in one or more of the "working" paths. At least one other prior art ring network employs only two communication paths to forward communications throughout the network during normal operating conditions, and in the event that one of those paths fails, the other path is employed as a backup to forward both its own transmission signals and those of the failed path. Some prior art networks are also equipped with equipment for enabling a "loopback" bypass configuration to be implemented in the event of a path failure, for enabling signals to be forwarded to intended destinations.

Most prior art ring communication networks employ time-multiplexing techniques to time-multiplex channels, and perform switching between channels by rearranging time slots in a predetermined manner. In Wavelength-Division Multiplexed (WDM) networks, on the other hand, optical channel signals having respective wavelengths are multiplexed onto a single waveguide, and are demultiplexed such that each channel signal is individually routed to a predetermined destination. An example of one prior art WDM ring communications network that includes protection equipment is depicted in FIG. 1a, and is identified by reference numeral 11.

The network 11 of FIG. 1a includes optical add/drop multiplexer/demultiplexers (OADMS) 1, 3, and 5, a plurality of communication nodes (also referred to as terminals) 9a, 9b, and 9c, a plurality of switching modules 2, 6, and 4, a plurality of working communication links 7a-7a", 7b-7b", and a plurality of protection communication links 8a-8a", 8b-8b". The switching modules 2 and 6 are coupled together through the links 7a', 7b', 8a', and 8b', the switching modules 4 and 6 are coupled together through links 7a", 7b", 8a", and 8b", and switching modules 2 and 4 are coupled together through links 7a, 7b, 8a, and 8b.

Referring also to FIG. 1b, a block diagram is shown of an OADM 1' and a switching module (SM) that is coupled to the OADM 1'. The OADM 1' of FIG. 1b represents individual ones of the OADMs 1, 3, and 5 of FIG. 1a, and the switching module (SM) of FIG. 1b represents in further detail individual ones of the modules 2, 4, and 6 of FIG. 1a. The switching module (SM) includes a 6×6 optical switch (S) that is coupled to the OADM 1', and electrical variable optical attenuators (EVOAs) E1 and E2 that are interposed between the OADM 1' and switch (S). The switch (S) has a plurality of inputs (I), each of which is coupled to a corresponding communication link from FIG. 1a, and also has a plurality of outputs (O), each of which is coupled to a corresponding communication link from FIG. 1a.

During normal operating conditions (i.e., in cases where the working links 7a-7a", 7b-7b" are functioning properly), the switch (S) of each module 2, 4, 6 is maintained in a configuration that enables the terminals 9a-9c to communicate with one another through the OADMs 1, 3, 5, the modules 2, 4, 6, and the working communication links 7a-7b". However, during cases in which one or more of the working links 7a-7b" fail(s), then the switches (S) of the modules coupled to those links are configured to enable the failed links to be bypassed, and to enable signals to be exchanged between the terminals 9a-9c by way of selected ones of the protection links 8a-8b".

It would be desirable to provide a network having other types of configurations for providing span and/or ring (i.e., loopback) protection against network component failures. It would also be desirable to provide a network in which minimal signal losses are incurred during bypass operations, without requiring a large number of amplifiers and without incurring a narrowing of available bandwidth.

SUMMARY OF THE INVENTION

It is a first object of this invention to provide an optical ring communications network which provides protection against network component failures.

It is a another object of this invention to provide an improved optical line node for a network, wherein the optical line node protects against network component failures.

It is a further object of this invention to provide an optical communications network which protects against network component failures while minimizing signal losses, bandwidth reduction, and the number of amplifying components employed.

Further objects and advantages of this invention will become apparent from a consideration of the drawings and ensuing description.

The foregoing and other problems are overcome and the objects of the invention are realized by a method for protecting against component failures in an optical ring communications network, and an optical ring communications network that operates in accordance with the method. In accordance with one embodiment of the invention, the optical ring communications network comprises a plurality of first (primary), "working" communication paths, a plurality of second (secondary), "protection" communication paths, and a plurality of nodes. Adjacent ones of the nodes are preferably coupled together through at least one of the first communication paths and at least one of the second communication paths, and preferably form a ring configuration.

In accordance with one embodiment of this invention, each node preferably comprises a first switch and a second switch, each of which has a first terminal coupled to an end of at least one respective first communication path, a second terminal coupled to an end of at least one respective second communication path, a third terminal, and a fourth terminal. The third terminal of the first switch is preferably bidirectionally coupled to the third terminal of the second switch through at least one third communication path, and each first and second switch is preferably a 4×4 optical switch.

Each node of the network also preferably comprises at least one multiplexer/demultiplexer (MUX/DEMUX) device that is bidirectionally coupled to an external communication node (such as a node operating in accordance with the Asynchronous Transfer Mode (ATM) or the Internet Protocol (IP) (e.g., an ATM switch or IP router), or a node of the Synchronous Optical Network (SONET)), and to the fourth terminal of each first and second switch. The MUX/DEMUX device may include, for example, an optical add/drop multiplexer/demultiplexer (OADM) device or a plurality of multiplexers and demultiplexers interconnected within optical line terminals (OLTS) of the node. Preferably, the MUX/DEMUX device is a Wave-Division-Multiplexed (WDM) device, and operates by forwarding signals through the node by way of the third terminals of the first and second switches, and by forwarding signals that are communicated between the external communication node and another network node by way of the fourth terminal of individual ones of the first and second switches.

Preferably, each node of the optical ring network also comprises at least one controller that is coupled to the first and second switches. The controller is responsive to applied input information indicating that a failure has occurred in at least one of the first communication paths for controlling at least one of the first and second switches. Such control causes that at least one switch to be placed in a configuration which enables the failed path(s) to be bypassed, and a bypass communication path to be established for forwarding signals to their intended destinations. Span or ring ("loopback") switching configurations can be implemented, depending on whether only a first communication path fails, or both first and second communication paths fail.

The input information applied to the controller may be generated in response to a monitor within the node detecting a failure in one or more communication paths, or may be generated in a similar manner within another node of the network, in which case the generated information is provided from that other node to the controller by way of one of the communication paths.

In accordance with other embodiments of the invention, other types of switches are employed in lieu of 4×4 switches, such as, for example, 1×2 switches or both 1×3 switches and 2×3 switches, and appropriate switching arrangements are carried out in response to failures being detected in communication paths of the network, for bypassing the failed network component(s).

BRIEF DESCRIPTION OF THE DRAWINGS

The above set forth and other features of the invention are made more apparent in the ensuing Detailed Description of the Preferred Embodiments when read in conjunction with the attached drawings, wherein.

Identical portions of the various figures have been identified with the same reference numerals in order to simplify the description of the present invention. Components having similar purposes have been designated using the same reference numerals with at least one prime added.

DESCRIPTION OF THE PREFERRED EMBODIMENTS

Figure 1A:
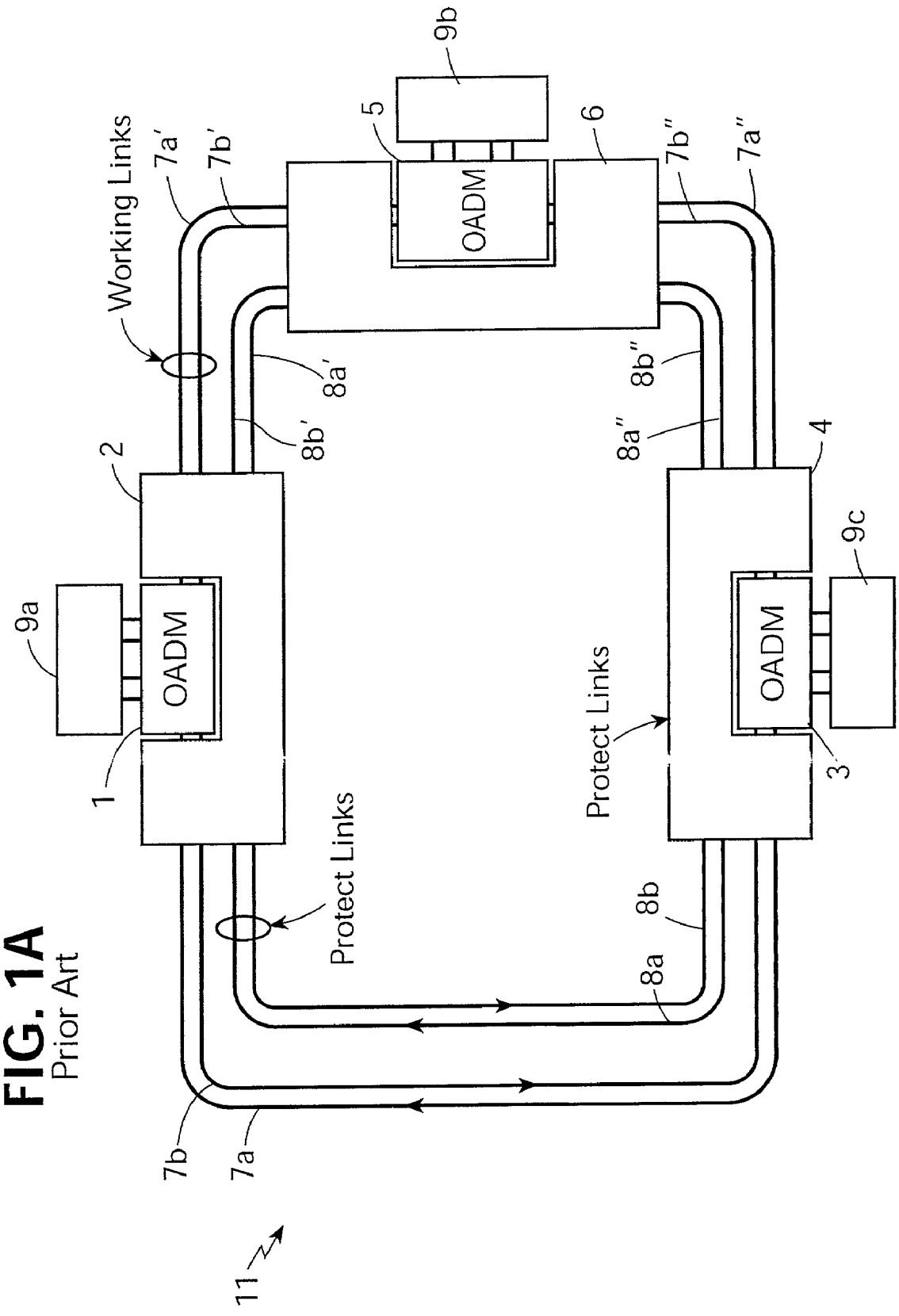
FIG. 1a shows a block diagram of an optical ring communication network that is constructed in accordance with the prior art, and which is optically coupled to a plurality of communication nodes.
Figure 1B:
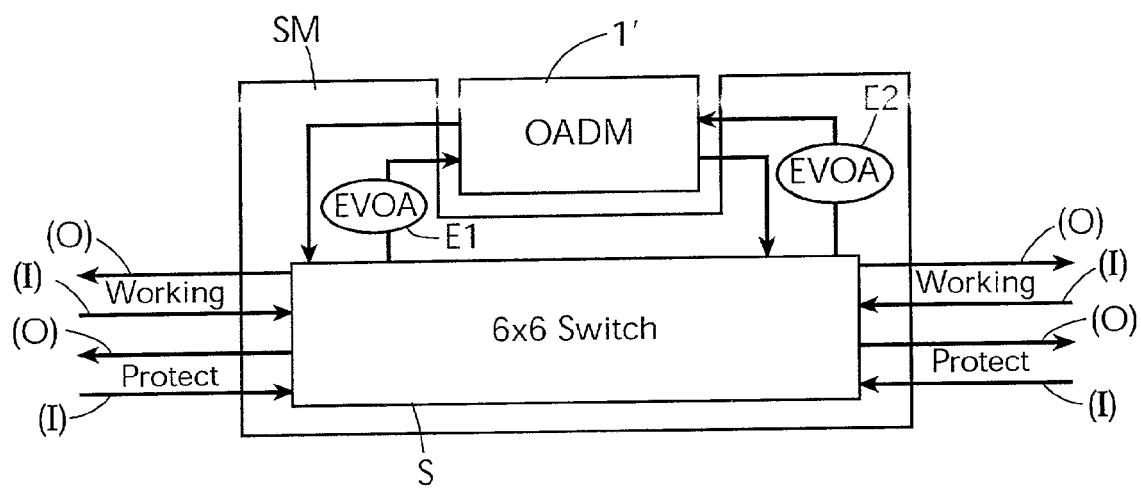
FIG. 1b shows a block diagram of an optical add/drop multiplexer (OADM) coupled to a switching module, in accordance with the prior art.
Figure 2:
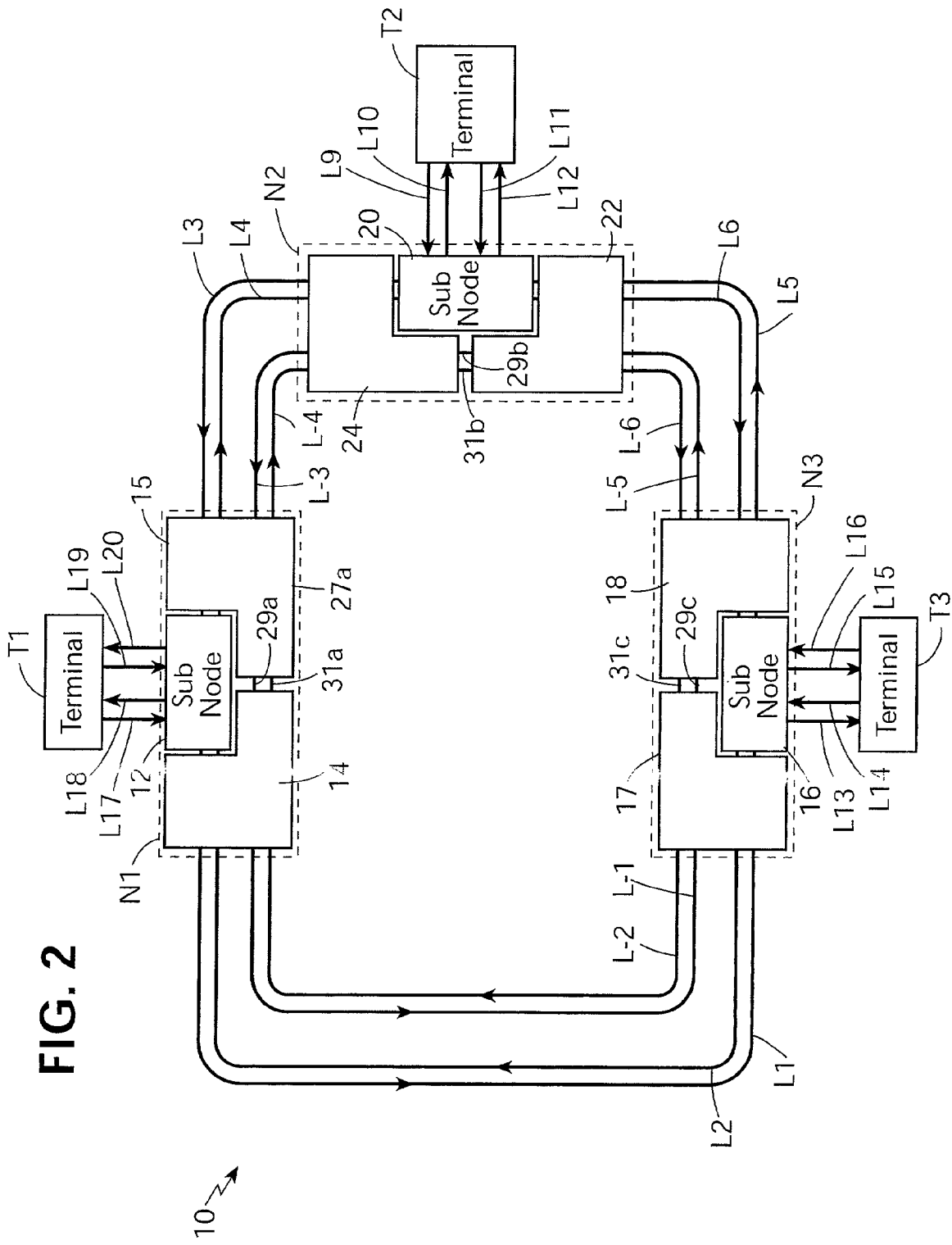
FIG. 2, shows an optical ring communications network that includes nodes constructed and operated in accordance with this invention.

FIG. 2 illustrates a block diagram of an optical ring communication network 10 that is suitable for practicing this invention. In accordance with a preferred embodiment of this invention, the network 10 comprises a plurality of optical nodes N1, N2, and N3, each of which is optically coupled to a respective communication node (hereinafter referred to as a "terminal") T1, T2, and T3 by way of a respective plurality of communication links (also referred to as "communication paths") L17-L20, L9-L12, and L13-L16. The communication network 10 preferably also comprises a plurality of primary, "working" communication links L1-L6 and a plurality of secondary, "protection links" links L-1 to L-6, each of which includes, for example, an optical fiber for carrying a plurality of (e.g., 32) wavelengths, and is also hereinafter referred to as a "communication path". Preferably, each communication link L9-L20 also includes an optical fiber.

Each individual terminal T1, T2, and T3 may be, for example, one or more nodes operating in accordance with the Asynchronous Transfer Mode (ATM) or the Internet Protocol (IP) (e.g., an ATM switch or IP router), or a node of the Synchronous Optical Network (SONET). It should be noted, however, that the present invention, broadly construed, is not limited to any one particular type of communication protocol, standard, or network.

In a preferred embodiment of this invention, each of the nodes N1, N2, N3 comprises a respective sub-node 12, 20, 16 that is coupled to a respective one of the terminals T1, T2, T3 through a respective one of the groups of communication links L17-L20, L9-L12, and L13-L16. In accordance with an aspect of this invention, node N1 also comprises a plurality of protection modules 14 and 15, node N2 comprises a plurality of protection modules 22 and 24, and node N3 comprises a plurality of protection modules 17 and 18.

The protection modules 14 and 15 of node N1 are optically coupled together by way of communication paths 29a and 31a, the protection modules 24 and 22 of node N2 are optically coupled together by way of communication paths 29b and 31b, and protection modules 17 and 18 of node N3 are optically coupled together by way of communication paths 29c and 31c.

Additionally, the protection module 14 of node N1 is optically coupled to the protection module 17 of node N3 through the links L1, L2, L-1, and L-2, the protection module 15 of node N1 is optically coupled to protection module 24 of node N2 through the links L3, L4, L-3, and L-4, and the protection module 22 of node N2 is optically coupled to protection module 18 of node N3 through the links L5, L6, L-5, and L-6.

Figure 3:
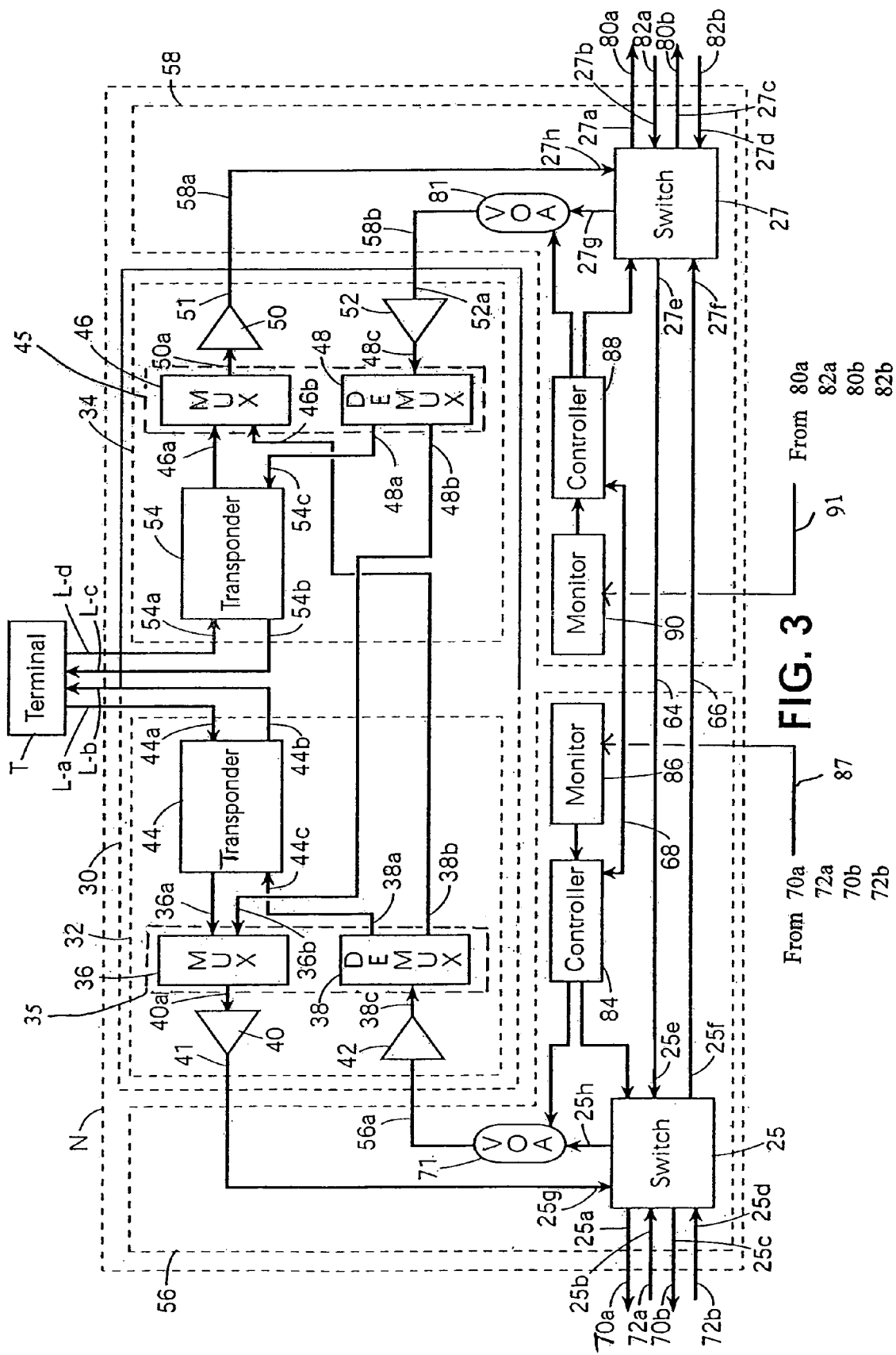
FIG. 3 shows in further detail a construction of an individual node of the network of FIG. 2, in accordance with one embodiment of this invention.

Reference is now made to FIG. 3, which is a block diagram of an optical node N that is coupled to a terminal T through a plurality of optical links L-a, L-b, L-c, and L-d. The node N represents in further detail individual ones of the nodes N1, N2, and N3 of FIG. 2. According to a preferred embodiment of the invention, the node N comprises a sub-node 30, and a pair of protection modules 56 and 58 that are constructed in accordance with this invention. The sub-node 30 shown in FIG. 3 represents in further detail individual ones of the sub-nodes 12, 16, and 20 of FIG. 2, the protection module 56 shown in FIG. 3 represents in further detail individual ones of the protection modules 14, 24, and 18 of FIG. 2, and the protection module 58 of FIG. 3 represents in further detail individual ones of the protection modules 15, 22, and 17 of FIG. 2. Also, the terminal T of FIG. 3 represents individual ones of the terminals T1, T2, and T3 of FIG. 2, and the collective optical communication links L-a, L-b, L-c, and L-d of FIG. 3 represent respective ones of the groups of links L9-L12, L13-L16, and L17-L20 of FIG. 2.

Preferably, the sub-node 30 comprises a pair of optical line terminals (OLTs) 32 and 34, although in other embodiments, the node 30 may comprise an optical add/drop multiplexer/demultiplexer (OADM) instead, and, depending on the particular configuration of the OADM, the number of links which couple the node N to terminal T may be more or less than that shown in FIG. 3. As is known in the art, OADMs operate by either passing at least some signals received at a node through the node, adding signals received by the node from an external source (e.g., terminal T), for enabling those added signals to be forwarded to another destination within the network, and by dropping at least some signals received by the node from other sources (e.g., other nodes) to predetermined destinations (e.g., terminal T).

The OLT 32 preferably comprises a transponder 44, a bidirectional multiplexing/demultiplexing device 35 including a multiplexer (MUX) 36 and a demultiplexer (DEMUX) 38, and amplifiers 40 and 42, and the OLT 34 preferably comprises a transponder 54, a bidirectional multiplexing/demultiplexing device 45 including a multiplexer (MUX) 46 and a demultiplexer (DEMUX) 48, and amplifiers 50 and 52. Preferably, the MUXs 36 and 46 and DEMUXs 38 and 48 are Wavelength-Division-Multiplexed (WDM) devices.

In the embodiment of this invention shown in FIG. 3, the multiplexer 36 and demultiplexer 38 of OLT 32 are shown as embodied in multiplexer/demultiplexer (MUX/DEMUX) 35, and the multiplexer 46 and demultiplexer 48 of OLT 34 also are embodied in MUX/DEMUX 45. It is within the scope of this invention for the multiplexer 36 and demultiplexer 38 of OLT 32 to be embodied either as separate devices or single multiplexer/demultiplexer (MUX/DEMUX) devices, and for the multiplexer 46 and demultiplexer 48 of OLT 34 to be embodied either as separate devices or single MUX/DEMUX devices. Also, the transponders 44 and 54 of the respective OLTs 32 and 34 preferably are bidirectional transponders, although in other embodiments, a plurality of unidirectional transponders may be employed instead, or no such transponders need be employed in the OLTs 32 and 34.

The various components of the OLT 32 will now be described in greater detail. The transponder 44 of OLT 32 has an input 44a that is optically coupled to the terminal T through link L-a, and is responsive to a signal being applied to that input 44a for operating in a known manner to output a corresponding signal having a predetermined wavelength to an input 36a of the MUX 36. The transponder 44 also has an input 44c that is coupled to an output 38a of the DEMUX 38, and an output 44b that is optically coupled to the terminal T through link L-b. The transponder 44 also is responsive to a signal being applied to the input 44c for outputting a corresponding signal having a predetermined wavelength to the terminal T by way of link L-b.

In addition to the input 36a, the MUX 36 of OLT 32 also has an input 36b that is optically coupled to an output 48b of the DEMUX 48 of OLT 34. The MUX 36 operates in a known manner for coupling different wavelength signals applied to respective ones of the inputs 36a and 36b to an input 40a of the amplifier 40, which, in turn, amplifies the signals and provides resultant amplified signals to the protection module 56, through output 41 of the OLT 32. The DEMUX 38 of OLT 32 has an input 38c that is coupled to an output 56a of the protection module 56 through the amplifier 42 of the OLT 32. Amplifier 42 amplifies signals received from the output 56a of protection module 56, and outputs resultant amplified signals to the DEMUX 38, which, in turn, demultiplexes those signals and outputs corresponding signals, each having a predetermined wavelength, through corresponding outputs 38a and 38b of the DEMUX 38.

Having described the various components of the OLT 32 of FIG. 3, the various components of OLT 34 of FIG. 3 will now be described in greater detail. The transponder 54 of the OLT 34 has an input 54a that is optically coupled to an output of the terminal T through link L-d. The transponder 54 is responsive to a signal being applied to the input 54a for outputting a corresponding signal having a predetermined wavelength to an input 46a of the MUX 46. Transponder 54 also has an input 54c that is coupled to an output 48a of the DEMUX 48, and an output 54b that is optically coupled to an input of the terminal T, through link L-c. The transponder 54 is responsive to a signal being applied to that input 54c for outputting a corresponding signal having a predetermined wavelength to the terminal T, by way of the link L-c.

In addition to the input 46a, the MUX 46 of the OLT 34 has an input 46b that is coupled to the output 38b of the DEMUX 38 of OLT 32. The MUX 46 preferably operates in a known manner for coupling different wavelength signals applied to respective ones of the inputs 46a and 46b, to input 50a of amplifier 50. The amplifier 50 then amplifies the signals output from the MUX 46, and outputs resultant amplified signals through output 51 to input 58a of protection module 58. Amplifier 52 has an input 52a that is coupled to an output 58b of the protection module 58. The amplifier 52 amplifies signals that are applied to that input 52a, and outputs resultant amplified signals to an input 48c of the DEMUX 48, which, in turn, demultiplexes those signals and outputs corresponding signals, each having a predetermined wavelength, through corresponding outputs 48a and 48b of the DEMUX 48. It should be noted that although the MUXs 36, 46 and DEMUXs 38, 48 are shown as having only two input terminals and two output terminals, respectively, in other embodiments, those devices may have more than that number of terminals, depending on the number of channels required to be added/dropped.

Having described the components of the node 30 of FIG. 2, the protection modules 56 and 58 according to a preferred embodiment of this invention will now be described. In accordance with an aspect of this invention, the protection modules 56 and 58 are employed to detect communication path (e.g., link) failures in the optical ring network 10, and to enable alternate, functioning communication paths to be selected in response thereto, for routing signals to and from the node 30, as will be described further below.

In accordance with a presently preferred embodiment of this invention, the protection module 56 comprises a 4×4 optical switch 25, a local controller 84, a monitor block 86, and a variable optical attenuator (VOA) 71. Similarly, the protection module 58 preferably comprises a 4×4 optical switch 27, a local controller 88, a monitor block 90, and a variable optical attenuator (VOA) 81.

The monitor blocks 86 and 90 monitor for the presence or absence of light in the communication paths 70*a*, 70*b*, 72*a*, 72*b*, 80*a*, 82*b*, 82*a*, 82*b* by determining in a known manner whether or not light in the individual paths equals or exceeds a predetermined threshold. The monitor blocks 86 and 88 also notify the respective controllers 84 and 88 regarding whether or not light is detected in those paths. A detection revealing that light is absent in a communication path is indicative of a failure in the path or a failure in a path coupled thereto. For example, light may be absent in the communication path as a result of a failure of a corresponding communication link.

The monitor blocks 86 and 90 each may be embodied as one or more optical sensors, such as a photodiode, although, for convenience, only the two monitor blocks 86 and 90 are shown in FIG. 3. In an exemplary embodiment, each communication path 70*a*, 70*b*, 72*a*, 72*b*, 80*a*, 82*b*, 82*a*, 82*b* (i.e., L1-L6 and L-1 to L-6 of FIG. 2) may have its own dedicated optical sensor(s) for detecting the presence or absence of light in the path. For example, the sensors may be integral parts of the switches 25 and 27, or may be tapped into a selected point in either the paths 70*a*, 70*b*, 72*a*, 72*b*, 80*a*, 82*b*, 82*a*, 82*b*, outputs paths 01' (shown in FIG. 8, described below) of the protection modules 56, 58, communication paths included within OLTs 32 and 34, the paths 64 and 66 coupling the protection modules 56 and 58 together, or the paths coupling the protection modules 56 and 58 to the respective OLTs 32 and 34 (although this also is not shown for convenience). Preferably, the sensors are employed for detecting the presence or absence of light in paths carrying a control channel to a node, although in other embodiments, both incoming and outgoing paths from a node may be monitored, in which case the sensors on the outgoing paths detect the presence or absence of light by measuring return losses and optical reflections in a known manner.

The controllers 84 and 88 function to coordinate both the exchange of signals between the node 30 and other, adjacent nodes of the network 10 (FIG. 2), and the exchange of signals between the node 30 and the terminal T, in the event that a failure is detected in a communication path by a respective monitor block 86 or 90. The controllers 84 and 88 are coupled to the switches 25 and 27, and control the configurations (i.e., positions) of the respective switches 25 and 27 in response to receiving either a failure notification signal from a corresponding monitor block 86 or 90, or a failure notification signal from another node controller, as will be described in more detail below. The controllers 84 and 88 are also coupled to the VOAs 71 and 81, respectively, and, according to a preferred embodiment of the invention, and referring also to FIG. 8, are also bidirectionally coupled together through a communication path 68.

The VOAs 71 and 81 are each operated in a known manner for optimizing the levels of optical signal passing therethrough. For example, depending on predetermined operating criteria, various components located downstream from the respective VOAs 71 and 81 may require certain optical levels for operating most effectively. After a switching configuration is implemented (in the manner as will be described below) in a node to bypass one or more failed communication paths, optical power levels of signals present in the node may differ from those present prior to the switching change. To compensate for this difference, the VOAs 71, 81 of the node can be adjusted to optimize those signal levels, in accordance with the requirements of the downstream components. The adjustments may be performed based upon a difference between predetermined desired power levels and predetermined post-switching node signal levels or losses, or based upon a difference between predetermined desired power levels and an optical power measurement obtained, after switching occurs, at some predetermined point downstream from the respective VOAs (e.g., at client equipment located at an end of an optical path). The individual VOAs 71, 81 are preferably adjusted using a closed loop procedure for optimizing the signal levels for the downstream components (e.g., client equipment or transponders 44 and 54). The precise manner in which the VOAs 71 and 81 are controlled and operated for use in the nodes of this invention will not be described in further detail, and is assumed to be within the knowledge of one skilled in the art.

Figure 8:
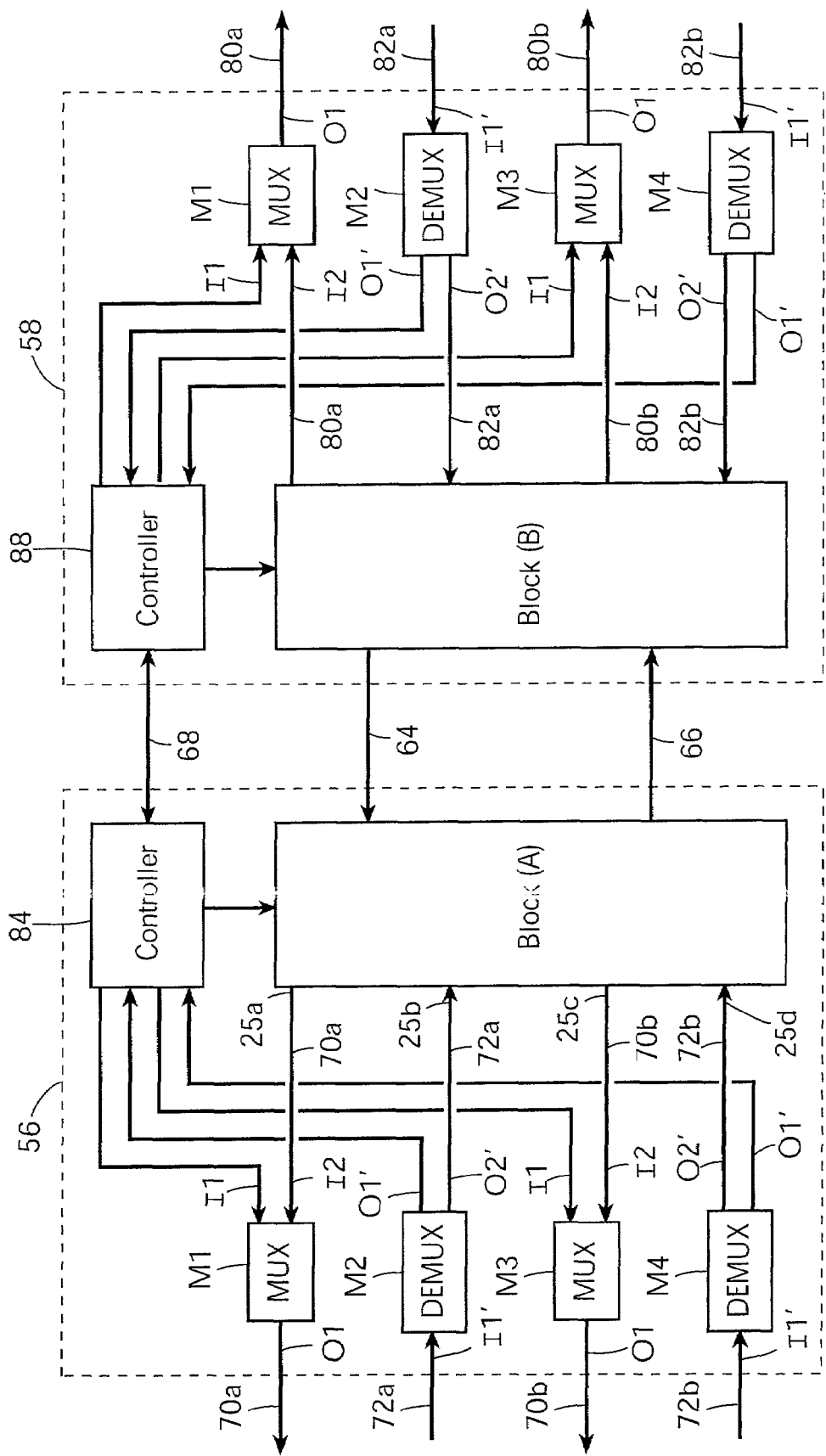
FIG. 8 shows a portion of an individual node of the network of FIG. 2.

Referring now to FIG. 8, each protection module 56 and 58 preferably also comprises multiplexers (MUXS) M1, M3 and demultiplexers (DEMUXS) M2, M4, although for convenience this is not shown in FIG. 3. The MUXs M1, M3 and DEMUXs M2, M4 are preferably Wavelength-Division-Multiplexed (WDM) devices, and are employed to enable signals to be exchanged between the switches 25 and 27 of adjacent ones of the nodes N1, N2, and N3, and between the controllers 84 and 88 of adjacent ones of the nodes N1, N2, and N3, by way of the communication paths L1 to L6 and L-1 to L-6 (FIG. 3). The MUXs M1 of each module 56 and 58 have an input (I2) and an output (O1) that are each coupled in a corresponding communication path 70*a*, 80*a*, and also have an input (I1) that is coupled to an output of a corresponding controller 84, 88 of the respective module 56, 58. The DEMUXs M2 of each module 56 and 58 have an input (I1') and an output (O2') that are each coupled in a corresponding communication path 72*a*, 82*a*, and also have an output (O1') that is coupled to an input of the corresponding controller 84, 88. Similarly, the MUXs M3 of each module 56 and 58 have an input (I2) and an output (O1) that are each coupled in a corresponding communication path 70*b*, 80*b*, and also have an input (I1) that is coupled to an output of a corresponding controller 84 and 88 of a respective module 56, 58. Moreover, the DEMUXs M4 of each module 56 and 58 have an input (I1') and an output (O2') that are each coupled in a corresponding communication path 72*b*, 82*b*, and also have an output (O1') that is coupled to an input of a corresponding controller 84, 88. For the embodiment of the node N depicted in FIG. 3, the blocks (A) and (B) of FIG. 8 represent the switches 25 and 27, respectively.

The MUXs M1 and M3 of each module 56 and 58 each couple different wavelength signals applied to respective ones of the inputs (I1) and (I2) of the MUX, to the MUX output (O1), for enabling the signals to be forwarded to another node via a corresponding communication path 70*a*, 70*b*, 80*a*, 80*b*. The DEMUXs M2 and M4 of each module 56 and 58 each demultiplex signals received in a corresponding communication path 72*a*, 72*b*, 82*a*, and 82*b* (and applied to the input (I1') of the DEMUX), and output corresponding signals, each having a predetermined wavelength, through corresponding outputs (O1') and (O2') of the DEMUX.

Having described the various components of the network 10 in detail, a method in accordance with an embodiment of this invention will now be described, with reference to the flow diagram of FIGS. 4*a*-4*d* (in conjunction with FIGS. 2 and 3). In this exemplary embodiment, it is assumed that the monitor block 86 of each node N1, N2, and N3 is employed for detecting the presence or absence of light on both ingoing and outgoing paths 70*a*, 70*b*, 72*a*, 72*b* (FIG. 2) from the node, and that the monitor block 90 of each node N1, N2, and N3 is employed for detecting the presence or absence of light on both the ingoing and outgoing paths 80*a*, 80*b*, 82*a*, 82*b* (FIG. 2) from the node. The method of FIGS. 4*a*-4*d* is preferably implemented in accordance with a program, executed by controllers 86, 88 of the individual nodes N1, N2, N3, and stored in a memory (not shown) of those nodes N1, N2, N3.

At block A1, the method is started, and it is assumed that the network 10 is operating in a normal operating mode wherein all of the network components are functioning properly. During this operating mode, the monitor block 86 of each node N1, N2, and N3 detects light in each of the corresponding communication paths 70a, 70b, 72a, and 72b ('N' at blocks A2 and A5-a), and, as a result, the controller 84 of the node maintains the corresponding switch 25 in an initial configuration for coupling 1) switch input 25b to switch output 25h, 2) switch input 25g to switch output 25a, 3) switch input 25d to switch output 25f, and 4) switch input 25e to switch output 25c (block A2-a). Also during this operating mode, the monitor block 90 of each node N1, N2, and N3 detects light in each of the corresponding communication paths 80a, 80b, 82a, and 82b ('N' at blocks A2 and A5-a), and, as a result, the controller 88 of the node maintains the corresponding switch 27 in an initial configuration for coupling 1) switch input 27h to switch output 27a, 2) switch input 27b to switch output 27g, 3) switch input 27d to switch output 27e, and 4) switch input 27f to switch output 27c (block A2-a). It also is assumed that signals are being provided from terminal T1 to terminal T2 by way of the link L19, the OLT 34 and switch 27 of node N1, the communication link L4, the switch 25 and OLT 32 of node N2, and the link L10 (see, e.g., FIGS. 2 and 3).

At some time later, it is assumed that a failure occurs in one of the primary links coupled between nodes N1 and N2, such as, for example, link L4, and that the monitor block 90 of node N1 and the monitor block 86 of node N2 each detect the failure in that link L4 ('y' at block A2). As a result, control passes to block A3 where the monitor blocks 90 and 86 of the respective nodes N1 and N2 each respond to detecting the failure in the primary link L4 by notifying the corresponding controller 88, 84 that a failure has occurred in the link L4 (block A3). Assuming that each monitor block 90, 86 also outputs information to the corresponding controller 88, 84 indicating that light is present in the secondary link L-4 ('y' at block A4), then control passes through connector (A) to block A5 FIG. 4b, where the controllers 88 and 84 of the respective nodes N1 and N2 each respond by performing further steps, as will now be described.

Figure 4A:
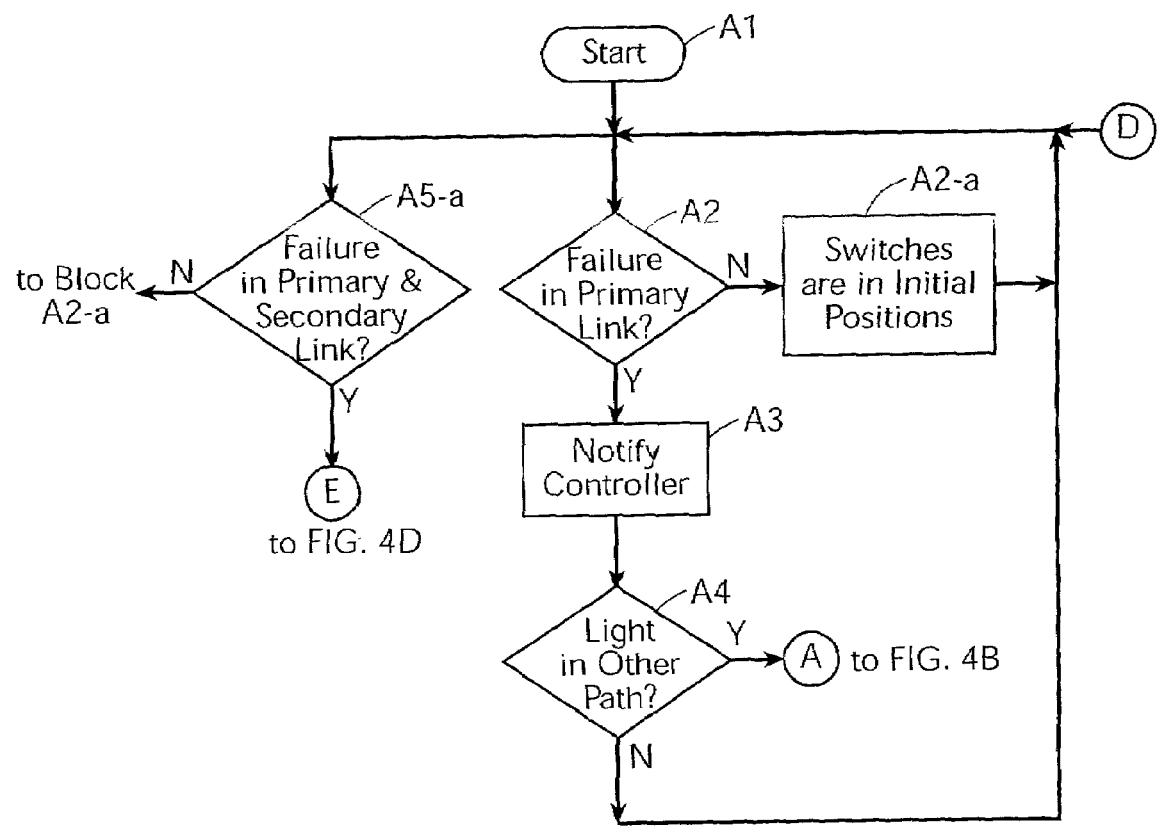
FIGS. 4a-4d are a logical flow diagram depicting a method in accordance with one embodiment of this invention.
Figure 4C:
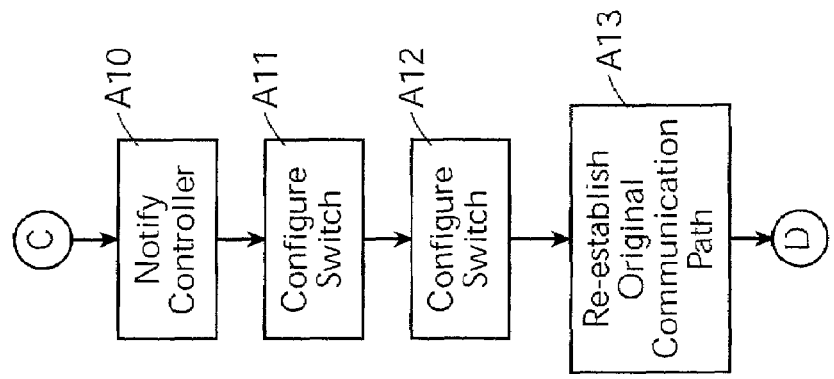
Figure 4B:
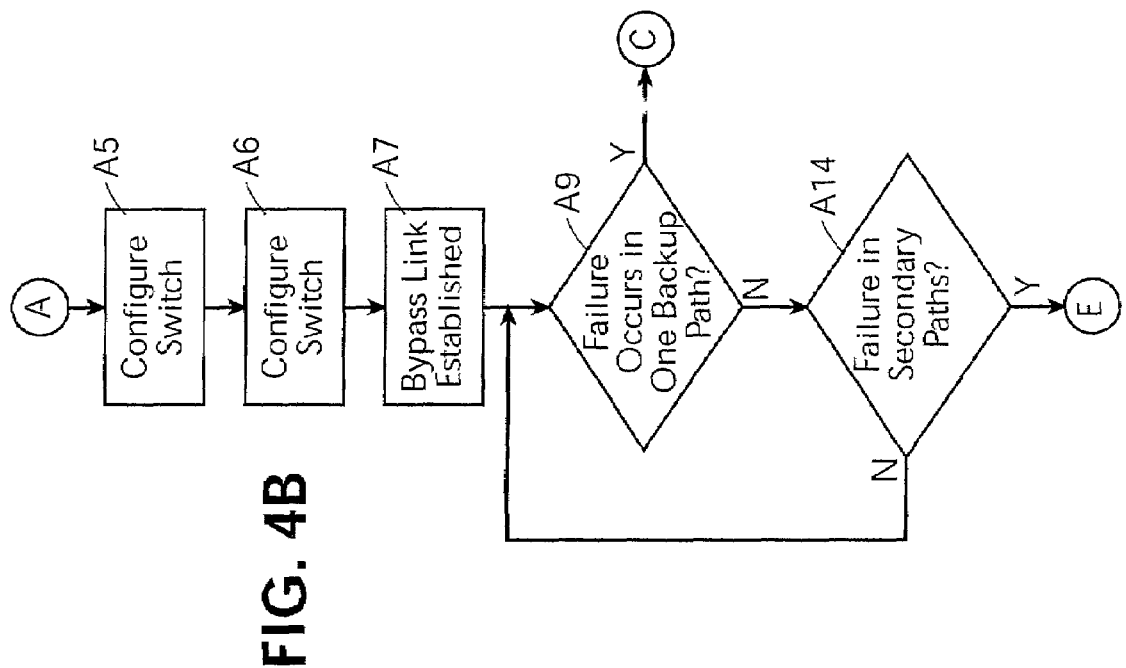

At block A5 of FIG. 4b, the controller 84 of node N2 configures the switch 25 to cause a) the switch input 25g to be coupled to switch output 25c, b) switch input 25d to be coupled to switch output 25h, c) switch input 25e to be coupled to switch output 25a, and d) switch input 25b to be coupled to switch output 25f (block A5). At block A6 the controller 88 of node N1 configures the switch 27 to cause a) the switch input 27h to be coupled to switch output 27c, b) switch input 27d to be coupled to switch output 27g, c) switch input 27b to be coupled to switch output 27e, and d) switch input 27f to be coupled to switch output 27a (block A6).

As a result of the switching operations performed at blocks A5 and A6, the failed link L4 is bypassed, and a backup communication path is established which enables signals originating from terminal T1, to be forwarded to the terminal T2 (block A7, FIG. 4b). The established backup communication path in this example includes the link L19 (FIG. 2) (i.e., link L-d of FIG. 3), the components 54, 46, 50, and 27 of node N1 (FIG. 3), the secondary link L-4, the switch 25, components 71, 42, 38, and 44 of node N2 (FIG. 3), and the link L10 (FIG. 2) (i.e., link L-b of FIG. 3). Preferably, the switching operations performed at blocks A5 and A6 are performed in a manner which minimizes the amount of signal traffic lost as a result of the failure in the primary communication path L4.

The switching operations performed at blocks A5 and A6 also establish a backup communication path that enables signals originating from terminal T2, to be forwarded to terminal T1. In this example, that backup communication path includes the link L9 (i.e., link L-a of FIG. 3), the components 44, 36, 40, and 25 of node N2 (FIG. 3), the link L-3, the switch 27, components 81, 52, 48, and 54 of node N1 (FIG. 3), and the link L20 (FIG. 2) (i.e., link L-c of FIG. 3). Preferably, the switches 25 and 27 of the respective nodes N2 and N1 then remain in the configurations in which they were placed at blocks A5 and A6, respectively ('N' at block A9), until a failure is detected in one of the secondary links L-3 and L-4.

As an example, it is assumed that at some time after the backup communication paths are established, a failure occurs in one of the secondary links L-3 and L-4 coupled between nodes N1 and N2, such as, for example, link L-4, and the monitor blocks 90 and 86 of nodes N1 and N2, respectively, detect the failure in that link L-4 ('y' at block A9). As a result, control passes through connector (C) to block A10 of FIG. 4c where the monitor blocks 90 and 86 of respective nodes N1 and N2 individually respond to detecting the failure in the secondary link L-4 by notifying the corresponding controllers 88 and 84, respectively, that a failure has occurred in the secondary link L-4. Assuming that the monitor blocks 90 and 86 also detect the presence of light in the primary link L4, and provide information indicating such to the respective controllers 88 and 84, then the controllers 84 and 88 individually respond in steps A11 and A12 (FIG. 4c), respectively, by configuring the respective switches 25 and 27 of the corresponding nodes N2 and N1 in the following manner.

At block A11, the controller 84 of node N2 configures the switch 25 of that node to cause a) the switch input 25g to be coupled to switch output 25a, b) switch input 25d to be coupled to switch output 25f, c) switch input 25e to be coupled to switch output 25c, and d) switch input 25b to be coupled to switch output 25h (block A11). At block A12 the controller 88 of node N1 configures the switch 27 of the node N1 to cause a) switch input 27h to be coupled to switch output 27a, b) switch input 27d to be coupled to switch output 27e, c) switch input 27f to be coupled to switch output 27c, and d) switch input 27b to be coupled to switch output 27g (block A12).

As a result of the switching operations performed at blocks A11 and A12, the failed secondary link L-4 is bypassed, and the original communication paths, including links L4 and L3, are re-established for forwarding signals being exchanged between terminals T1 and T2 (block A13). Thereafter, control passes through connector (D) back to FIG. 4a, where the method continues therefrom.

Referring again to FIG. 4a, an example of a case in which a failure is detected in a primary link and a corresponding secondary link coupled between nodes of the network 10, will now be described. For example, at block A5-a of FIG. 4a, it is assumed that the links L4 and L-4, coupled between nodes N1 and N2, fail, and that the monitor blocks 86 and 90 of the respective nodes N2 and N1 individually detect the failures in those links (block A5-a). As a result, control passes through connector (E) to block A15 of FIG. 4d, where those monitor blocks 86 and 90 respond by notifying the corresponding controllers 84 and 88 that a failure has occurred in those links L4 and L-4. The controllers 84 and 88 of the respective nodes N2 and N1 then individually respond by configuring the corresponding switches 25 and 27, at respective blocks A16 and A17, in the following manner.

At block A16, the controller 84 of node N2 configures the switch 25 to cause switch input 25g to be coupled to switch output 25f, and also to cause the switch input 25e to be coupled to switch output 25*h* (block A16). At block A17, the controller 88 of node N1 configures the switch 27 of the node N1 to cause the switch input 27*f* to be coupled to switch output 27*g*, and also to cause the switch input 27*h* to be coupled to switch output 27*e* (block A17).

As a result of the switching operations performed at blocks A16 and A17, the failed links L4 and L-4 are bypassed, and backup (e.g., "loopback") communication paths are established to enable signals to be exchanged between the terminals T1 and T2 (block A18). In this example, a first one of the established backup communication paths forwards signals originating from terminal T1, to terminal T2, and includes the link L19 (FIG. 2), the components 54, 46, 50, and 27 of node N1 (FIG. 3), the path 64 and switch 25 of node N1, link L-1, node N3 (e.g., components 27, 64, and 25 of node N3), link L-5, the switch 27, path 64, switch 25, and components 71, 42, 38, and 44 of node N2 (FIG. 3), and the link L10 of FIG. 2 (corresponding to link L-b of FIG. 3). A second one of the established backup communication paths enables signals originating from terminal T2 to be forwarded to terminal T1, and includes the link L9 of FIG. 2 (corresponding to link L-a of FIG. 3), the components 44, 36, 40, and 25 of node N2, path 66 and switch 27 of node N2 (FIG. 3), the link L-6 (FIG. 2), node N3 (e.g., components 25, 66 and 27 of node N3), link L-2, and components 25, 66, 27, 81, 52, 48, and 54 of node N1, and link L20 of FIG. 2 (which corresponds to link L-c of FIG. 3). Preferably, the switches 25 and 27 of each node N2 and N1 then remain in their present configurations until at least one of the failed primary and secondary links L4 and L-4 is repaired and light is again detected therein.

As an example, at some time after the step of block A18 is performed, it is assumed that the failed links L4 and L-4 are repaired, and that, as a result, light is again detected in those links by the monitor blocks 86 and 90 of the nodes N2 and N1, respectively (block A19). In response to individually detecting the presence of light in those links L4 and L-4, and also detecting the presence of light in the link L3, the monitor blocks 86 and 90 notify the corresponding controllers 84 and 88 (block A20), which then respond in respective blocks A21 and A22 by reconfiguring the corresponding switches 25 and 27 of the corresponding nodes N2 and N1 to again cause those switches 25 and 27 to be placed in their initial configurations (i.e., the configurations in which those switches were placed at block A2-*a*).

As a result of the switching operations performed at blocks A21 and A22, signals can again be transmitted from the terminal T1 to terminal T2 by way of the node N1, the primary link L4, and the node N2, and signals also can again be transmitted from terminal T2 to terminal T1 by way of the node N2, the primary link L3, and the node N1. Control then passes through connector (D) back to FIG. 4*a*, where the method continues in the manner described above.

Referring again to FIG. 4*b*, an example of a case in which a failure occurs in at least one of the secondary links L-3 and L-4 after the bypass communication path is established at block A7, will now be described. For example, it is assumed that, after the step of block A7 is performed, the secondary links L-3 and L-4 fail, and the monitor blocks 86 and 90 of nodes N2 and N1, respectively, detect the failures in those links ('n' at block A9, 'y' at block A14). As a result, control passes through connector (E) to block A15 of FIG. 4*d* where the monitor blocks 86 and 90 respond to detecting the failures by notifying the corresponding controllers 84 and 88 of the detected failures. Assuming that the primary links L3 and L4 have not yet been repaired, and that, as a result, the monitor blocks 86 and 90 do not detect light in those links L3 and L4 (and therefore output information indicating such to the corresponding controllers 84 and 88), then the method continues in the above-described manner, for enabling signals to be exchanged between the terminals T1 and T2 by way of the secondary links L-1, L-2, L-5, L-6 and nodes N1, N3, and N2.

Having described a method in which the nodes perform switching operations in response to individually detecting a loss of light in one or more incoming and outgoing communication paths from a node, an alternate embodiment of this invention will now be described. In this embodiment of the invention, switching operations are performed in response to a node receiving a failure notification signal from another node. This embodiment of the invention may be employed in cases in which, for example, the monitor blocks 86 and 90 of each node N1, N2, and N3 monitor only those paths (e.g., links 72*a*, 72*b*, 82*a*, 82*b*) which forward incoming light signals to the node. An example of this embodiment of the invention will now be described, with reference again being made to FIG. 4*a*.

In this example, it again is assumed that at block A1 the network 10 is operating in the normal operating mode wherein all of the network components are functioning properly, and the controllers 84 and 88 of each node N1, N2, and N3 maintains the corresponding switches 25 and 27 in their initial configurations (block A2-*a*), and that signals are being provided from terminal T1 to terminal T2 by way of the link L19, the OLT 34 and switch 27 of node N1, the communication link L4, the switch 25 and OLT 32 of node N2, and the link L10 (see, e.g., FIGS. 2 and 3).

At some time later, it is assumed that a failure occurs in one of the primary links coupled between nodes N1 and N2, such as, for example, link L4, and that the monitor block 86 of node N2 detects the failure in that link L4 ('N' at block A2). As a result, control passes to block A3 where the monitor block 86 responds by notifying the corresponding controller 84 that a failure has occurred in the link L4. Assuming that the monitor block 86 also outputs information to that controller 84 indicating that light is present in the secondary link L-4 ('y' at block A4), then control passes through connector (A) to block A5 of FIG. 4*b*, where the controller 84 of node N2 responds by configuring the switch 25 in the above-described manner to cause a) the switch input 25*g* to be coupled to switch output 25*c*, b) switch input 25*d* to be coupled to switch output 25*h*, c) switch input 25*e* to be coupled to switch output 25*a*, and d) switch input 25*b* to be coupled to switch output 25*f* (block A5).

In accordance with this embodiment of the invention, the controller 84 also responds at block A5 by forwarding a failure notification signal indicating that a failure was detected in primary communication path L4, through the communication path 68 (FIG. 8) to the controller 88 of module 58 within the same node N2. The controller 88 then responds to receiving the failure notification signal from controller 84 by forwarding that signal to node N3 by way of the MUX M1 (FIG. 8) of node N2, and the communication path L6 (FIG. 2) of the network 10. Thereafter, the failure notification signal passes internally through node N3 by way of the node components M2 and 84 (of module 56 of FIG. 8), 68, and components 88 and M1 (module 58) of FIG. 8, and is then forwarded to the node N1 via the communication path L2 (FIG. 2) of the network 10. Within the node N1, the failure notification signal is then forwarded through the DEMUX M2 (module 56) to the controller 84 of that node N1, and then to the controller 88 of the node N1 via path 68. The controller 88 of node N1 then responds at block A6 by configuring the switch 27 in the above-described manner to cause a) the switch input 27*h* to be coupled to switch output 27*c*, b) switch input 27*d* to be coupled to switch output 27*g*, c) switch input 27*b* to be coupled to switch output 27*e*, and d) switch input 27*f* to be coupled to switch output 27*a* (block A6).

As a result of the switching operations performed at blocks A5 and A6, the failed link L4 is bypassed, and backup communication paths are established for enabling signals to be exchanged between the nodes N1 and N2 by way of secondary links L-3 and L-4 in the above-described manner.

At some time after the backup communication paths are established, it is assumed that the primary link L4 is repaired. It also is assumed that at some time later, a failure occurs in one of the secondary links L-3 and L-4 coupled between nodes N1 and N2, such as, for example, link L-4, and that the monitor block 86 of node N2 detects the failure in that link L-4 ('y' at block A9). As a result, control passes through connector (C) to block A10 of FIG. 4*c* where the monitor block 86 of node N2 responds by notifying the corresponding controller 84 of the detected failure in link L-4. Assuming that the monitor block 86 also detects the presence of light in primary link L4 and notifies the corresponding controller 84 accordingly, then the controller 84 responds at block A11 (FIG. 4*c*) by configuring the corresponding switch 25 of node N2 in the above-described manner to cause a) the switch input 25*g* to be coupled to switch output 25*a*, b) switch input 25*d* to be coupled to switch output 25*f*, c) switch input 25*e* to be coupled to switch output 25*c*, and d) switch input 25*b* to be coupled to switch output 25*h* (block A11). The controller 84 of node N2 also responds at block A11 by forwarding a failure signal indicating that a failure has occurred in the path L-4, to the controller 88 of node N1, by way of the path 68, controller 88, and MUX M1 of node N2 (FIG. 3), path L6 (FIG. 2), node N3, path L2 (FIG. 2), and the components M2, 84 and 68 of node N1 (FIG. 3). In response to receiving that signal, the controller 88 of node N1 then configures the switch 27 of node N1 in the above-described manner to again cause a) switch input 27*h* to be coupled to switch output 27*a*, b) switch input 27*d* to be coupled to switch output 27*e*, c) switch input 27*f* to be coupled to switch output 27*c*, and d) switch input 27*b* to be coupled to switch output 27*g* (block A12).

In this manner, the failed link L-4 is bypassed, and the original, primary communication paths L4 and L3 are re-established for forwarding signals being exchanged between terminals T1 and T2 (block A13). Thereafter, control passes through connector (D) to FIG. 4*a*, where the method continues in the above-described manner.

An example of the manner in which the present embodiment of the invention operates in a case in which a failure occurs in a primary communication path L1-L4 and a corresponding secondary communication path L-1 to L-4 at block A5-*a*, will now be described. In this example, it is assumed that a failure occurs in the primary link L4 and the secondary link L-4 at block A5-*a*, and that, as a result, the failure is detected by the monitor block 86 of node N2 in the above-described manner. Thereafter, control passes through connector (E) to block A15 of FIG. 4*d* where the monitor block 86 notifies the corresponding controller 84 of node N2 of the detected failures. Then, the controller 84 of node N2 responds by configuring the switch 25 of that node at block A16 in the same manner as described above, and also by communicating a failure notification signal (indicating that a failure occurred in links L4 and L-4) from the node N2 (via components 68, 88, and M1 (module 58) of node N2) to the controller 88 of node N1, by way of the link L6, node N3, link L2, and components M2 (block 56), 84, and 68 of node N1, in the above-described manner. The controller 88 of node N1 then responds by configuring the corresponding switch 27 of that node at block A17 in the above-described manner to enable the failed link L4 and L-4 to be bypassed, and the bypass communication paths to be established at block A18.

At some time after the step of block A18 is performed, it is assumed that the failed links L4 and L-4 are repaired, and that, as a result, light is again detected in those links by the monitor block 86 of node N2 (block A19). In response to detecting the presence of light in those links, the monitor block 86 notifies the corresponding controller 84 (block A20), which then responds at block A21 by reconfiguring the corresponding switch 25 to again cause that switch 25 to be placed in its original configuration. According to this embodiment of the invention, the controller 84 also responds at block at block A21 by communicating a signal indicating that light has again been detected in the previously-failed links L4 and L-4, from the node N2 (via node N2 components 68, 88, and M1 (module 58)) to the controller 88 of node N1, by way of the link L6, node N3, link L2, and components M2 (module 56), 84, and 68 of node N1, in the above-described manner. The controller 88 of node N1 then responds by configuring the corresponding switch 27 at block A22 to place the switch 27 in its initial configuration, in the same manner as described above, for enabling signals to again be exchanged between the terminals T1 and T2 by way of the node N1, primary links L3 and L4, and the node N2. Control then passes through connector (D) to FIG. 4*a*, where the method then continues in the above-described manner.

An example of the manner in which the present embodiment (wherein incoming communication paths to a node are monitored) of the invention operates in response to a case in which a failure occurs in each of the links L3, L3, L4, and L-4 coupling together nodes N1 and N2, will now be described. In this example, it is assumed that a failure occurs in each of the primary links L3 and L4 and each of the secondary links L-3 and L-4 at block A5-*a*, and that, as a result, the failure in links L4 and L-4 is detected by the monitor block 86 of node N2, and the failure in links L3 and L-3 is detected by the monitor block 90 of node N1. Thereafter, control passes through connector (E) to block A15 of FIG. 4*d* where the monitor block 86 of node N2 notifies the corresponding controller 84 of node N2 of the detected failure of links L4 and L-4, and the monitor block 90 of node N1 notifies the controller 88 of node N1 of the detected failure in links L3 and L-3.

The controller 84 of node N2 responds to being notified of the failure in links L4 and L-4 by configuring the switch 25 of that node at block A16 in the same manner as described above for that block, and also by communicating a failure notification signal (indicating that a failure occurred in links L4 and L-4) from the node N2 (via components 68, 88, and M1 (module 58) of node N2) to the controller 88 of node N1, by way of the link L6, node N3, link L2, and components M2 (block 56), 84, and 68 of node N1, in the above-described manner.

The controller 88 of node N1 responds to being notified at block A15 by the monitor block 90 of node N1 of the failure in links L3 and L-3 by configuring the corresponding switch 27 of that node at block A17 in the same manner as described above for that block. As a result of these switching operations performed within the nodes N1 and N2, the failed links L3, L4, L-3, and L-4 are bypassed, and the bypass communication paths are established in the above-described manner at block A18. In addition, the controller 88 of node N1 also responds at block A17 (to the failure being detected in links L3 and L-3) by communicating a failure notification signal indicating that a failure occurred in links L3 and L-3 from the node N1 (via components 68, 84, and M1 (module 56) of node N1) to the controller 84 of node N2, by way of the link L1, node N3, link L5, and components M2 (block 58), 88, and 68 of node N2. The controller 84 of node N2 responds to receiving that failure notification signal by recognizing the occurrence of the failure in the links L3 and L-3, and the controller 88 of node N1 responds to receiving the failure notification signal originally transmitted by the controller 84 of node N2 at block A16 by recognizing the occurrence of the failure in the links L4 and L-4.

Figure 5:
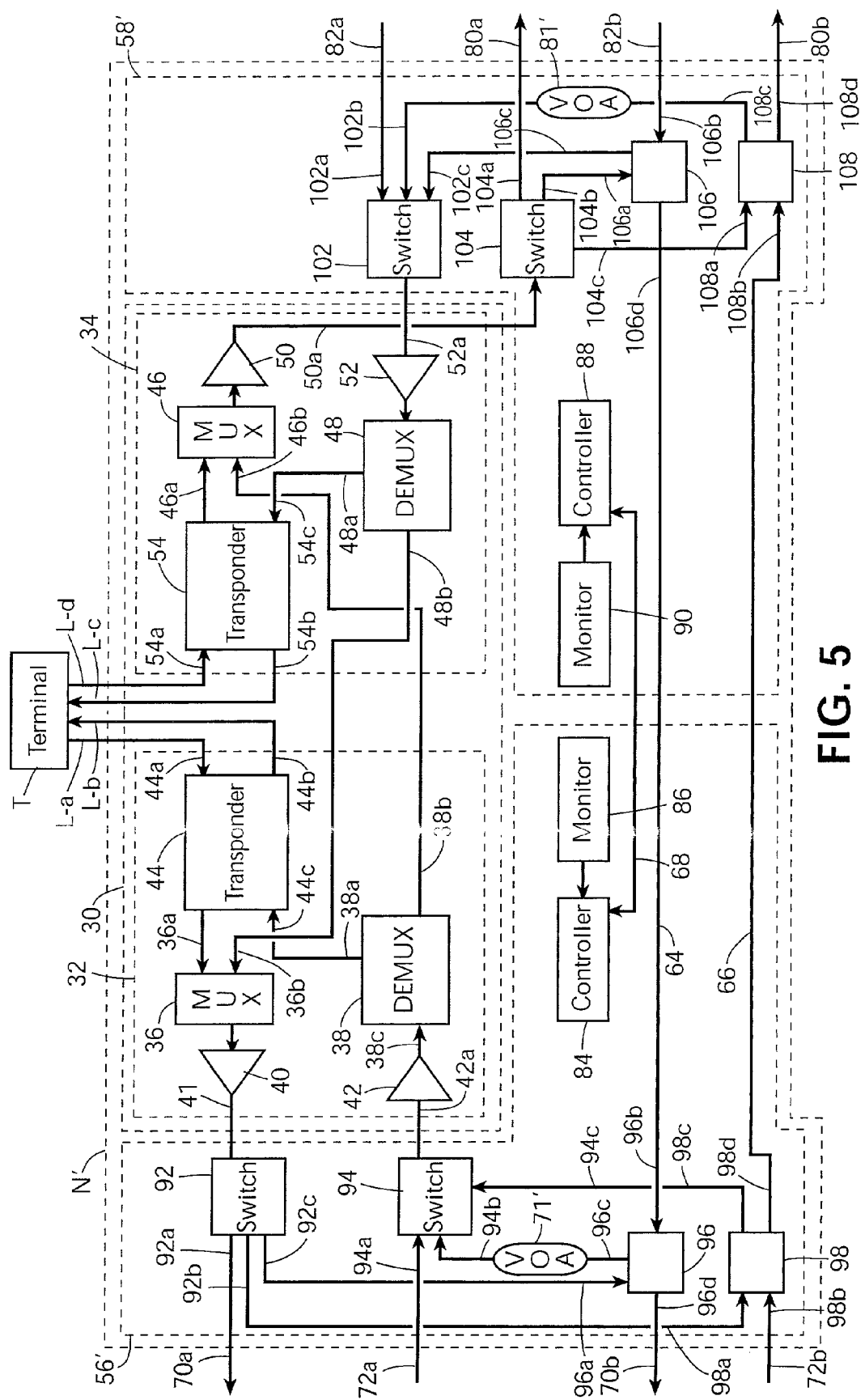
FIG. 5 shows in further detail a construction of an individual node of the network of FIG. 2, in accordance with another embodiment of this invention.
Figure 7:
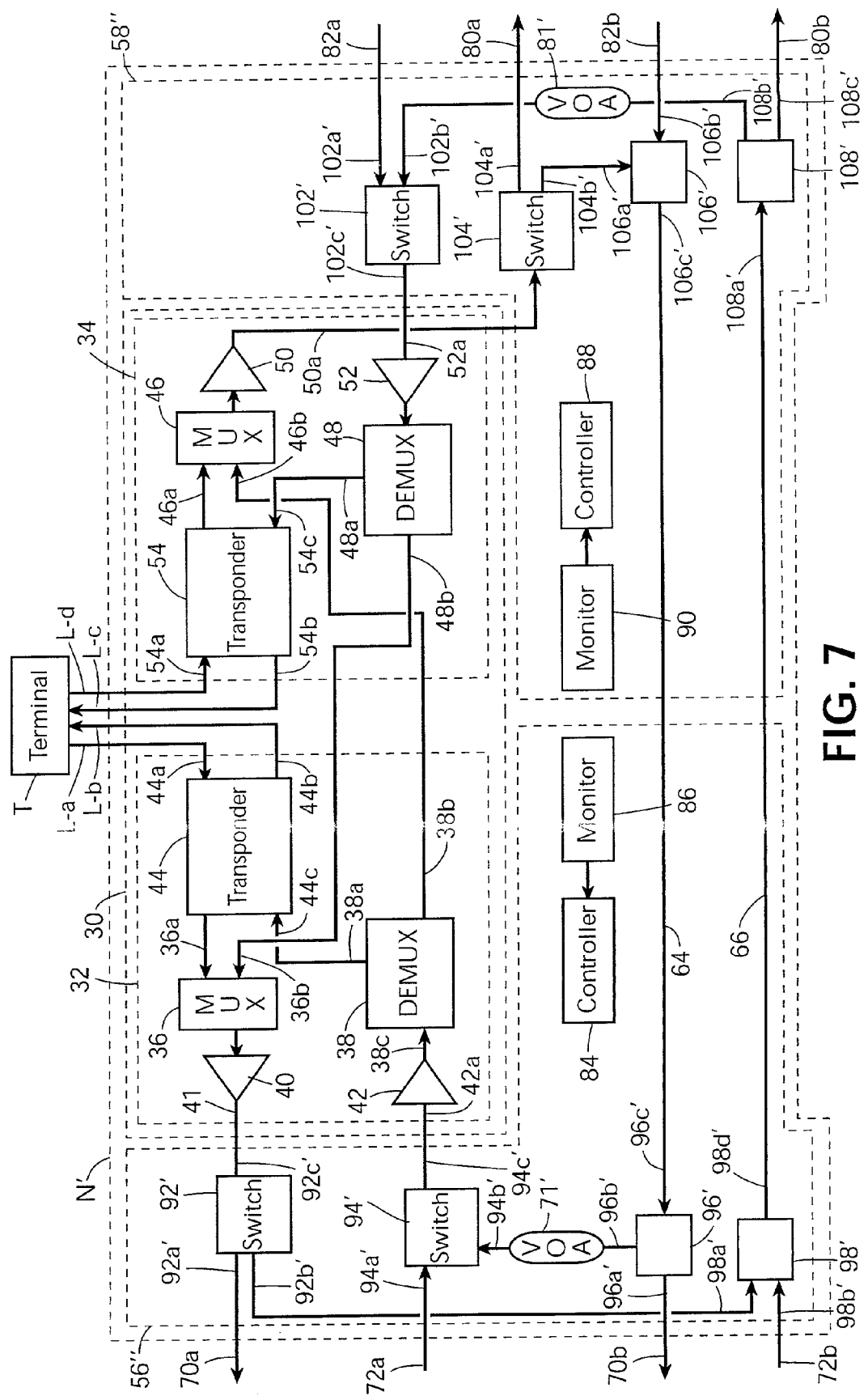
FIG. 7 shows in further detail a construction of an individual node of the network of FIG. 2, in accordance with a further embodiment of this invention.

It should be noted that although the foregoing switching operations are described in the context of the controller 84 of node N2 and the controller 88 of node N1 configuring the corresponding switches 25, 27 of those respective nodes in response to being notified of links failures by the monitor blocks 86 and 90, respectively, in another embodiment of the invention, the controller 88 of node N1 does not configure the switch 27 until receiving the notification signal from node N2 (i.e., the controller 88 configures switch 27 in response to both (an "AND" operation of both) the detection of the failures in links L3 and L-3 and the receipt of the notification from node N2), and the controller 84 of node N2 does not configure the switch 25 until receiving the notification signal from node N1 (i.e., the controller 84 configures switch 25 in response to both (an "AND" operation of both) the detection of the failures in links L4 and L-4 and the receipt of the notification from node N1) (this also applies to the embodiments described below and shown in FIGS. 5 and 7).

At some time after the step of block A18 is performed, it is assumed that the failed links L3, L4, L-3, and L-4 are repaired, and that, as a result, light is again detected in the links L4 and L-4 by the monitor block 86 of node N2, and light is again detected in the links L3 and L-3 by the monitor block 90 of node N1 (block A19). In response to detecting the presence of light in the links L4 and L-4, the monitor block 86 of node N2 notifies the corresponding controller 84 (block A20), which then responds at block A21 by communicating a signal indicating that light has again been detected in the links L4 and L-4, from the node N2 (via node N2 components 68, 88, and M1 (module 58)) to the controller 88 of node N1, by way of the link L6, node N3, link L2, and components M2 (module 56), 84, and 68 of node N1, in the above-described manner. Similarly, the monitor block 90 of node N1 responds to detecting the presence of light in the links L3 and L-3 at block A19 by notifying the corresponding controller 88 at block A20, which responds at block A21 by communicating a signal indicating that light has again been detected in the links L3 and L-3, from the node N1 (via node N1 components 68, 84, and M1 (module 56)) to the controller 86 of node N2, by way of the link L1, node N3, link L5, and components M2 (module 58), 88, and 68 of node N2.

Also at block A21, the controller 86 of node N2 responds to receiving that signal sent from node N1 (and to receiving the signal from the monitor block 90 indicating the detection of light in links L4 and L-4) (i.e., an "AND" of those signals) by reconfiguring the corresponding switch 25 of node N2 to again cause that switch 25 to be placed in its original configuration. Also, at block A22 the controller 88 of node N1 responds to receiving the signal originally transmitted from the node N2 at block A21 (and to receiving the signal from the monitor block 86 indicating the detection of light in links L3 and L-3) (i.e., an "AND" of those signals) by configuring the corresponding switch 27 to again cause that switch 27 to be placed in its original configuration. These switching operations performed within nodes N1 and N2 enable signals to again be exchanged between the terminals T1 and T2 by way of the node N1, primary links L3 and L4, and the node N2. Control then passes through connector (D) to FIG. 4a, where the method then continues therefrom.

It should be appreciated that, although the invention is described in the context of the nodes N1 and N2 performing the above-described bypass switching operations to bypass failed ones of the links L3, L4, L-3, and L-4, in cases in which failures occur in other links L1, L2, L5, L6, L-1, L-2, L-5, and L-6, similar switching operations as those described above are also performed within corresponding nodes coupled to those links (depending on which links fail), for bypassing those failed link(s), in a manner as would be readily appreciated by one skilled in the art in view of this description. It also should be noted that, while the above-described examples are described in the context of switching procedures being performed in response to failures being detected in either one primary link, one primary link and one secondary link, or two primary links and two secondary links, in cases in which other combinations of links fail, other appropriate switching procedures are performed for bypassing the failed link(s), in a manner as would be readily appreciated by one skilled in the art in view of this description.

Another embodiment of the invention will now be described, with reference being made to FIG. 5, which is a block diagram of a node N' that is constructed in accordance with this embodiment of the invention, and which is coupled to terminal T through links L-a to L-d. The node N' comprises the same components as the node N of FIG. 3 (including those shown in FIG. 8), except that the node N' of FIG. 5 includes protection modules 56' and 58', instead of the modules 56 and 58. Also, in this embodiment blocks (A) and (B) of FIG. 8 represent the collective components 92, 94, 96, 98, 71', and 102, 104, 106, 108, 81', respectively, of FIG. 5.

In accordance with this embodiment of the invention, in addition to the components 84, (A), and M1-M4 (module 56) of FIG. 8, the protection module 56' of FIG. 5 comprises a plurality of optical switches 92, 94, 96, and 98, local controller 84, monitor block 86, and a variable optical attenuator 71'. Similarly, in addition to components 88, (B), and M1-M4 (module 58) of FIG. 8, the protection module 58' preferably comprises optical switches 102, 104, 106, and 108, local controller 88, monitor block 90, and variable optical attenuator 81'.

The components 84, 86, 88, and 90 are similar to those described above, and thus will not be described in further detail. Like the above-described embodiment shown in FIG. 3, in the present embodiment shown in FIG. 5 each or selected ones of the communication paths 70a, 70b, 72a, 72b, 80a, 82b, 82a, 82b (i.e., L1 to L6, L-1 to L-6 of FIG. 2), or only those paths providing incoming signals to a node, may be monitored by optical sensor(s) for detecting the presence or absence of light in those paths, depending on applicable design criteria. The sensors may be, for example, integral parts of selected ones of the switches 92, 94, 96, 98, 102, 104, 106, and 108, or may be tapped into a selected point in either the selected ones of the paths 70a, 70b, 72a, 72b (e.g., 01' in that path in FIG. 8), 80a, 82b (e.g., 01' in that path FIG. 8), 82a, 82b, communication paths included within OLTs 32 and 34, the paths 64 and 66 coupling the protection modules 56' and 58' together, or the paths coupling the protection modules 56' and 58' to the respective OLTs 32 and 34 (although this is not shown in FIG. 5 for convenience).

Each switch 92, 94, 96, and 98 of the module 56' is coupled to an output of the controller 84, and each switch 102, 104, 106, and 108 of module 58' is coupled to an output of the controller 88, although, for clarity, this is not shown in FIG. 5. Each of the switches 92, 94, 102, and 104 preferably is a 1×3 optical switch, and each of the switches 96, 98, 106, and 108 preferably is a 2×2 optical switch.

The switch 92 of module 56' has an input that is coupled to an output 41 of amplifier 40 of OLT 32, and also has a plurality of outputs 92a-92c. Output 92a is coupled to link 70a, output 92b is coupled to an input 98a of switch 98, and output 92c is coupled to an input 96a of switch 96. Switch 94 has an output that is coupled to an input 42a of amplifier 42 of OLT 32, and also has a plurality of inputs 94a-94c. Input 94a is coupled to link 72a, input 94b is coupled to an output of the VOA 71', and input 94c is coupled to an output 98c of the switch 98. In addition to the input 96a, switch 96 also has an input 96b that is coupled to the communication path 64, an output 96c that is coupled to an input of the VOA 71', and an output 96d that is coupled to the link 70b. The switch 98 has, in addition to input 98a, an input 98b that is coupled to link 72b, an output 98c that is coupled to input 94c of switch 94, and an output 98d that is coupled to communication path 66.

Referring now to the protection module 58', the switch 102 of that module 58' has an input 102a that is coupled to link 82a, an input 102b that is coupled to an output of VOA 81', an input 102c that is coupled to an output 106c of switch 106, and an output that is coupled to an input 52a of amplifier 52 from OLT 34. Switch 104 has an input that is coupled to an output 50a of amplifier 50 from OLT 34, an output 104a that is coupled to link 80a, an output 104b that is coupled to input 106a of switch 106, and an output 104c that is coupled to an input 108a of switch 108. In addition to the input 106a and output 106c, the switch 106 has an input 106b that is coupled to link 82b, and an output 106d that is coupled to communication path 64. In addition to the input 108a, the switch 108 has an input 108b that is coupled to communication path 66, an output 108d that is coupled to link 80b, and an output 108c that is coupled to an input of VOA 81'.

Referring again to the flow diagram of FIGS. 4a-4d, in conjunction with FIGS. 2 and 5, a method in accordance with this embodiment of the invention will now be described. The steps of this method (e.g., FIGS. 4a-4d) are performed in a similar manner as was described above, except that while the network 10 is operating in a normal operating mode wherein all of the network components are functioning properly (and light is detected in each of the monitored communication paths ('y' at block A2)), the controller 84 of each node N1, N2, and N3 maintains each of the corresponding switches 92, 94, 96, and 98 of the node in an initial configuration in which (a) the input of switch 92 is coupled to the output 92a of that switch 92, (b) input 94a of switch 94 is coupled to the output of that switch 94, (c) input 96b of switch 96 is coupled to output 96d of the switch 96, and (d) input 98b of switch 98 is coupled to output 98d of that switch 98.

Also during this operating mode, the controller 88 of each node maintains each of the corresponding switches 102, 104, 106, and 108 in an initial configuration in which (a) the input 102a of switch 102 is coupled to the output of that switch 102, (b) the input of switch 104 is coupled to output 104a of that switch 104, (c) input 106b of switch 106 is coupled to output 106d of switch 106, and (d) input 108b of switch 108 is coupled to output 108d of the switch 108. It also is assumed that signals are being provided from terminal T1 to terminal T2 by way of the link L19, the OLT 34 and switch 104 of node N1, the communication link L4, switch 94 and OLT 32 of node N2, and the link L10.

At some time later, it is assumed that a failure occurs in a primary link coupled between nodes N1 and N2, such as link L4, and that the monitor block 86 of node N2 detects the failure in the link ('Y' at block A2). As a result, steps A3 to A6 are performed in a similar manner as described above. However, in this embodiment, at block A5 the controller 84 responds to the failure in link L4 being detected by monitor block 86 by a) configuring the switch 98 to cause input 98b to be coupled to input 94c of switch 94, b) configuring switch 94 to cause the input 94c to be coupled to the output of the switch 94, c) configuring switch 92 to cause the input of that switch to be coupled to the output 92c of the switch 92, and d) configuring switch 96 to cause that output 92c of switch 92 to be coupled to output 96d of switch 96 (block A5).

Also in this embodiment, at block A6 the controller 88 of node N1 configures the switches of node N1 (in response to either the monitor block 90 of node N1 detecting the failure in link L4 (in a case where at least outgoing paths from node N1 are monitored) or the controller 88 receiving a failure notification signal from the controller 84 of node N2 (in a case where incoming paths are monitored)) by a) configuring the switch 104 of the node N1 to cause the input of that switch to be coupled to the output 104c of that switch 104, b) configuring the switch 108 to cause the output 104c of switch 104 to be coupled to output 108d of the switch 108, c) configuring switch 106 to cause the input 106b of the switch 106 to be coupled to output 106c of the switch 106, and d) configuring switch 102 to cause the output 106c of switch 106 to be coupled to the output of the switch 102 (block A6).

As a result of the switching operations performed at blocks A5 and A6, the failed link L4 is bypassed, and a backup communication path is established which forwards signals originating from terminal T1, to the terminal T2 (block A7). The established backup communication path in this example includes the link L19 (FIG. 2), the components 54, 46, 50, 104, and 108 of node N1 (FIG. 5), the link L-4, switches 98, 94 and components 42, 38, and 44 of node N2 (FIG. 3), and the link L10 (FIG. 2). Preferably, the switching operations of blocks A5 and A6 are performed in a manner which minimizes the amount of signal traffic lost as a result of the failure in the communication path L4.

The switching operations performed at blocks A5 and A6 also establish a backup communication path for enabling signals to be forwarded from terminal T2 to terminal T1. This backup communication path includes the link L9 (L-a of FIG. 3), the components 44, 36, 40, 92, and 96 of node N2 (FIG. 3), the link L-3, switches 106, 102 and components 52, 48, and 54 of node N1 (FIG. 3), and the link L20 (FIG. 2).

At some time after the backup communication paths are established in block A7, it is assumed that the steps of blocks A9 (FIG. 4b) to A11 (FIG. 4c) are performed in a similar manner as was described above, except that at block A11, after the secondary link L-4 fails (block A9) and after being notified by monitor block 86 that light has again detected in the failed link L4 at block A10, the controller 84 of node N2 controls the switches 92, 94, 96, and 98 of that node N2 to again cause them to be placed in their initial configurations (block A11). Later, at block A12, in response to receiving a notification from either the monitor block 90 of node N1 (in the embodiment where block 90 monitors outgoing links L4 and L-4) or the controller 84 of node N2 in the above-described manner, the controller 88 of the node N1 controls the switches 102, 104, 106, and 108 of that node N1 to again cause them to be placed in their initial configurations (block A12).

As a result of the switching operations performed at blocks A11 and A12, the signals can again be forwarded from terminal T1 to terminal T2 by way of the node N1, the link L4, and the node N2, and signals can again be forwarded from terminal T2 to terminal T1 by way of the node N2, the link L3, and the node N1 (block A13). Control then passes through connector (D) back to FIG. 4a, where the method continues in the manner described above.

Referring again to FIG. 4a, an example of the manner in which the present embodiment of the invention operates in a case in which a failure occurs in a primary link and a corresponding secondary link will now be described. In this example, steps A5-a and A15-A17 (FIG. 4d) are performed in a similar manner as described above with respect to FIG. 3, except that, as a result of the monitor block 86 of node N2 detecting failures in those ones of the links L4 and L-4 monitored by the block 86, and then notifying the controller 84 of node N2 of the failures at block A15, the controller 84 of the node N2 then configures a) the switch 92 to cause the output 41 of amplifier 40 to be coupled to input 98a of switch 98, b) the switch 98 to cause the input 98a thereof to be coupled to output 98d of the switch 98, c) the switch 96 to cause the input 96b to be coupled to input 94b of switch 94 (via VOA 71'), and d) the switch 94 to cause the input 94b to be coupled to input 42a of the amplifier 42 (and, in one embodiment, the controller 84 also sends a notification signal indicating that links L4 and L-4 failed, to node N1 via previously described paths) (block A16). Also in this example, the controller 88 of node N1 configures (in response to receiving a notification regarding the link failures from either the monitor block 90 of node N1 or the node N2) a) the switch 108 of the node N1 to cause the input 108b to be coupled to output 108c, b) the switch 102 to cause the output 108c of switch 108 to be coupled (via VOA 81') to input 52a of amplifier 52, c) the switch 104 to cause the input of that switch 104 to be coupled to input 106a of switch 106, and d) the switch 106 to cause the input 106a to be coupled to output 106d (block A17).

As a result of the switching operations performed at blocks A16 and A17, the failed links L4 and L-4 are bypassed, and backup communication paths are established to enable signals to be exchanged between the terminals T1 and T2 (block A18). A first one of the established backup communication paths forwards signals originating from node N1 to node N2, and includes the link L19 (FIG. 2), the components 54, 46, 50, 104, 106, 64, and 96 of node N1, link L-1, node N3, link L-5, components 106, 64, 96, 71', 94, 42, 38, and 44 of node N2, and the link L10. A second one of the established backup communication paths enables signals originating from node N2 to be forwarded to node N1, and includes the link L9 (FIG. 2), the components 44, 36, 40, 92, 98, 66, and 108 of node N2, link L-6, node N3, link L-2, components 98, 66, 108, 81', 102, 52, 48, and 54 of node N1, and the link L20.

Figure 4D:
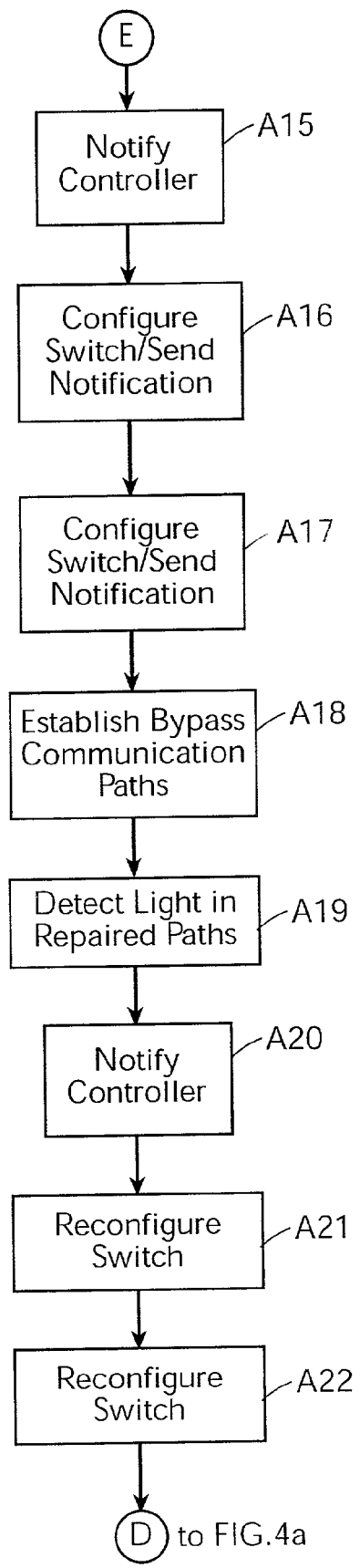

Thereafter, the further steps of FIG. 4d are performed in a similar manner as described above, except that, in this embodiment, at block A21 the controller 84 of node N2 controls the switches 92, 94, 96, and 98 of node N2 so as to place those switches in their initial configurations (block A21), and at block A22 the controller 88 of the node N1 (in response to either recognizing the link restoration or receiving a notification of link restoration from node N2) controls the switches 102, 104, 106, and 108 of that node N1 so as to place them in their initial configurations (block A22).

As a result of the switching operations performed at blocks A21 and A22, the signals can again be forwarded from terminal T1 to terminal T2 by way of the node N1, the link L4, and the node N2, and signals can again be forwarded from terminal T2 to terminal T1 by way of the node N2, the link L3, and the node N1. Control then passes through connector (D) back to FIG. 4a, where the method continues in the above-described manner.

An example of the manner in which the embodiment of FIG. 5 operates in a case where incoming communication paths of each node are monitored, and where a failure occurs in each of the links L3, L-3, L4, and L-4, will now be described. In this example, it is assumed that a failure occurs in each of the primary links L3 and L4 and each of the secondary links L-3 and L-4 at block A5-a, and that, as a result, the failure in links L4 and L-4 is detected by the monitor block 86 of node N2, and the failure in links L3 and L-3 is detected by the monitor block 90 of node N1. Thereafter, control passes through connector (E) to block A15 of FIG. 4d, where the method then continues through block A22 in a similar manner as does the FIG. 3 embodiment described above for the case in which all of the links L3, L4, L-3, and L-4 fail. However, for the present embodiment depicted in FIG. 5, in addition to transmitting failure notification signals from the respective nodes N2 and N1 at blocks A16 and A17, respectively, the switching procedures performed in those nodes N2 and N1 at the respective blocks A16 and A17 are performed as in the previous example for those blocks to establish a first backup path from node N1 to node N2, through link L19 (FIG. 2), the components 54, 46, 50, 104, 106, 64, and 96 of node N1, link L-1, node N3, link L-5, components 106, 64, 96, 71', 94, 42, 38, and 44 of node N2, and the link L10, and to establish a second backup path from node N2 to node N1, through link L9 (FIG. 2), the components 44, 36, 40, 92, 98, 66, and 108 of node N2, link L-6, node N3, link L-2, components 98, 66, 108, 81', 102, 52, 48, and 54 of node N1, and the link L20.

Also in the present example, at block A21 the controller 84 of node N2 controls the switches 92, 94, 96, and 98 of node N2 so as to place those switches in their initial configurations, and at block A22 the controller 88 of the node N1 controls the switches 102, 104, 106, and 108 of that node N1 so as to place them in their initial configurations (block A22), wherein these steps are performed after both nodes N1 and N2 communicate a failure notification signal to one another and, as a result, recognize that the failed links have been restored, in the above-described manner.

It should be noted that, in one embodiment of the invention, the controller 84 of node N2 and the controller 88 of node N1 configure the corresponding switches of those respective nodes in response to both 1) being notified of link failures or restoration by the respective monitor blocks 86 and 90, and 2) receiving a notification signal from the other node N1, N2, respectively (i.e., an "AND" operation of those two events).

Referring now to FIG. 7, a further embodiment of the invention will now be described. FIG. 7 is a block diagram of a node N'' that is constructed in accordance with this embodiment of the invention, and which is coupled to terminal T through links L-a to L-d. The node N'' comprises the same components as the node N' of FIG. 5, except that the node N'' of FIG. 7 includes protection modules 56'' and 58'', instead of the modules 56' and 58'. Also in this embodiment, the blocks (A) and (B) of FIG. 8 represent the collective components 92'-98', 71' and 102'-108', 81', respectively, of FIG. 7.

In accordance with this embodiment of the invention, the protection module 56'' comprises a plurality of 1×2 optical switches 92', 94', 96', 98', local controller 84, monitor block 86, and variable optical attenuator 71'. Similarly, the protection module 58'' preferably comprises a plurality of 1×2 optical switches 102', 104', 106', and 108', local controller 88, monitor block 90, and variable optical attenuator 81'.

The components 84, 86, 88, and 90 are similar to those described above, and thus will not be described in further detail. Each switch 92', 94', 96', and 98' of the module 56'' is coupled to an output of the controller 84, and each switch 102', 104', 106', and 108' of module 58'' is coupled to the controller 88, although, for convenience, this is not shown in FIG. 7.

The switch 92' of module 56'' has an input 92c' that is coupled to output 41 of amplifier 40 from OLT 32, an output 92a' that is coupled to link 70a, and an output 92b' that is coupled to an input 98a' of switch 98'. Switch 94' has an output that is coupled to input 42a of amplifier 42 from OLT 32, an input 94a' that is coupled to link 72a, and an input 94b' that is coupled to an output of the VOA 71'. Switch 96' has an input 96c' that is coupled to communication path 64, an output 96b' that is coupled to an input of the VOA 71', and an output 96a' that is coupled to the link 70b. The switch 98' has, in addition to input 98a', an input 98b' that is coupled to link 72b, and an output 98d' that is coupled to communication path 66.

Referring now to the protection module 58", the switch 102' of that module 58" has an input 102a' that is coupled to link 82a, an input 102b' that is coupled to an output of VOA 81', and an output 102c' that is coupled to input 52a of amplifier 52 from OLT 34. Switch 104' has an input 104c' that is coupled to output 50a of amplifier 50 from OLT 34, an output 104a' that is coupled to link 80a, and an output 104b' that is coupled to an input 106a' of switch 106'. The switch 106' has, in addition to input 106a', an input 106b' that is coupled to link 82b, and an output 106c' that is coupled to communication path 64. Moreover, Switch 108' has an input 108a' that is coupled to communication path 66, an output 108c' that is coupled to link 80b, and an output 108b' that is coupled to an input of VOA 81".

Figure 6:
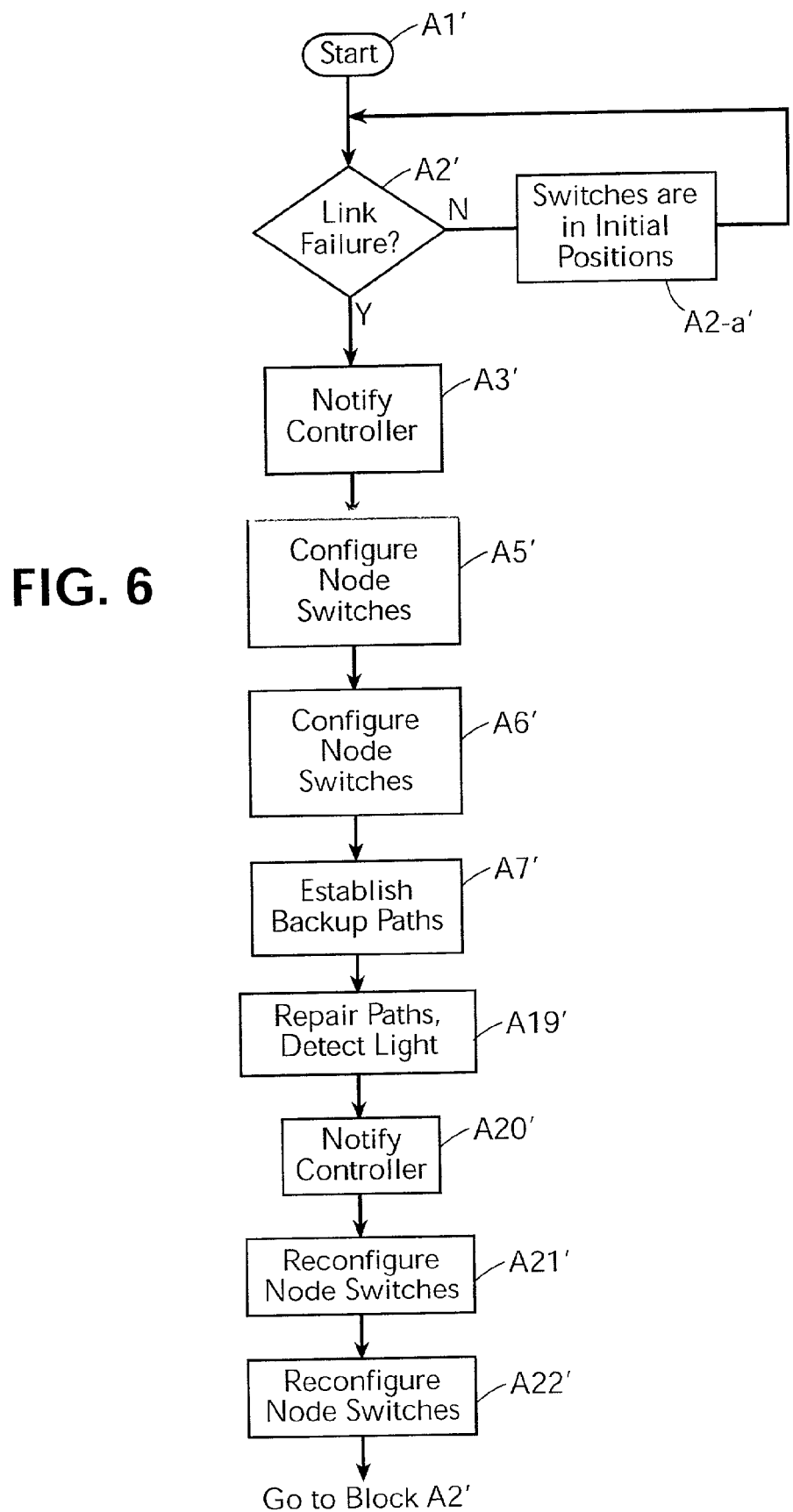
FIG. 6 is a logical flow diagram depicting a method according to another embodiment of this invention.

Referring to the flow diagram of FIG. 6, in conjunction with FIGS. 2 and 7, a method in accordance with this embodiment of the invention will now be described. At block A1' the method is started, and it is assumed that the network 10 is operating in a normal operating mode wherein all of the network components are functioning properly. During this operating mode, light is detected in each of the monitored communication paths ('N' at block A2') in the above-described manner (by node optical sensors monitoring selected ones of the paths), and, as a result, the controller 84 of each node N1, N2, and N3 controls the corresponding switches 92', 94', 96', and 98' of the node so that each of those switches is maintained in initial configuration (block A2-a'). In this initial configuration, the input 92c' of switch 92' is coupled to the output 92a' of that switch 92', input 94a' of switch 94' is coupled to the output 94c' of that switch 94', input 96c' of switch 96' is coupled to output 96a' of the switch 96', and input 98b' of switch 98' is coupled to output 98d' of that switch 98'. Also during this operating mode, the controller 88 of each node controls the switches 102', 104', 106', and 108' so as to maintain each switch in an initial configuration. In this initial configuration, the input 102a' of switch 102' is coupled to the output 102c' of that switch 102', the input 104c' of switch 104' is coupled to output 104a' of that switch 104', input 106b' of switch 106' is coupled to output 106c, of switch 106', and input 108a' of switch 108' is coupled to output 108c' of that switch 108'. It also is assumed that signals are being provided from terminal T1 to terminal T2 by way of the link L19, the OLT 34 and switch 104' of node N1, the communication link L4, switch 94' and OLT 32 of node N2, and the link L10.

At some time later, it is assumed that a failure occurs in a primary link coupled between the nodes N1 and N2, such as, for example, the primary link L4 ('Y' at block A2'), and that, as a result, the steps of blocks A3', A5', and A6' are performed. In this example, the step of block A3' is preferably performed in a similar manner as the step of block A3 of FIG. 4a described above, and the steps of blocks A5' and A6' are preferably performed in a similar manner as the steps of blocks A5 and A6 (FIG. 4b), respectively, described above, except that at block A5' of FIG. 6, the controller 84 of node N2 configures a) the switch 92' of that node to cause the input 92c' of switch 92' to be coupled to output 92b' of the switch 92', b) the switch 98' to cause the input 98a' of the switch 98' to be coupled to output 98d' of the switch 98', c) the switch 96' to cause the input 96c' to be coupled to output 96b', and d) the switch 94' to cause the input 94b' to be coupled to output 94c' of the switch 94' (block A5').

Also, at block A6', the controller 88 of node N1 configures a) the switch 108' of the node N1 to cause the input 108a' to be coupled to output 108b', b) the switch 102' to cause the input 102b' of switch 102' to be coupled to output 102c', c) the switch 104' to cause the input 104c' of that switch 104' to be coupled to output 104b', and d) the switch 106' to cause the input 106a' to be coupled to output 106c' of that switch 106' (block A6').

As a result of the switching operations performed at blocks A5' and A6', the failed link L4 is bypassed, and alternate communication paths are established for enabling signals to be exchanged between the terminals T1 and T2 (block A7'). A first one of the established backup communication paths forwards signals originating from node N1 to node N2, and includes the link L19 (FIG. 2), the components 54, 46, 50, 104', 106', 64, and 96' of node N1, link L-1, node N3, link L-5, components 106', 64, 96', 71', 94', 42, 38, and 44 of node N2, and the link L10. A second one of the established backup communication paths enables signals originating from node N2 to be forwarded to node N1, and includes the link L9 (FIG. 2), the components 44, 36, 40, 92', 98', 66, and 108' of node N2, link L-6, node N3, link L-2, components 98', 66, 108', 81', 102', 52, 48, and 54 of node N1, and the link L20.

At some time later, it is assumed that the failed link L4 is repaired, and that, as a result, steps A19'-A22' are performed. Preferably, those steps are performed in a similar manner as steps A19-A22, respectively, described above, except that, in this embodiment, at block A21' the controller 84 of node N2 controls the switches 92', 94', 96', and 98' of the node N2 so as to again place those switches in their initial configurations (block A21'), and at block A22', the controller 88 of the node N1 controls the switches 102', 104', 106', and 108' of that node N1 so as to again place them in their initial configurations (block A22').

As a result of the switching operations performed at blocks A21' and A22', the signals can again be forwarded from terminal T1 to terminal T2 by way of the node N1, the link L4, and the node N2, and signals can again be forwarded from terminal T2 to terminal T1 by way of the node N2, the link L3, and the node N1. Control then passes back to block A2', where the method continues in the above-described manner.

It should be noted that, in the embodiments depicted in FIGS. 3, 5, and 7, the above-described switching operations implemented in node N1 may be performed in response to either the monitor block 90 of the node N1 detecting the absence (or presence, in the case of a repaired link) of light in one or more corresponding communication paths, or in response to the controller of the node N1 receiving a notification signal from node N2 in the above-described manner.

Also, although the invention has been described above in the context of the various switching operations being implemented in response to a detection of a failure in either a primary link, a primary and a secondary link, or all of the communication links coupled between the adjacent nodes N1 and N2, it also is within the scope of this invention to implement suitable switching operations in response to a detection of failures in other combinations of communication paths, in a manner as would be readily apparent to one skilled in the art in view of this description. For example, in a case where incoming communication paths to each node of FIG. 7 are monitored, and where a failure occurs in each of the links L3, L-3, L4, and L-4, procedures similar to those performed for the FIG. 5 embodiment described above (for such a case) are performed, except that in the FIG. 7 embodiment, the switching procedures establish a first backup communication path from node N1 to node N2, through the link L19 (FIG. 2), the components 54, 46, 50, 104', 106', 64, and 96' of node N1, link L-1, node N3, link L-5, components 106', 64, 96', 71', 94', 42, 38, and 44 of node N2, and the link L10, and a second backup communication path from node N2 to node N1, through the link L9 (FIG. 2), the components 44, 36, 40, 92', 98', 66, and 108' of node N2, link L-6, node N3, link L-2, components 98', 66, 108', 81', 102', 52, 48, and 54 of node N1, and the link L20. Other predetermined switching operations may also be implemented in response to a failure being detected in one or more other predetermined links, depending on applicable design criteria.

Also, although the invention has been described in the context of the employing the secondary paths (after a primary communication path failure) as working paths until the previously-failed primary path is repaired and a failure is detected in the secondary paths, it also is within the scope of this invention to implement switching control operations for switching back to the primary path immediately upon the repair of the primary paths, and to account for any race conditions during those and the other switching operations described above, in a manner as would be readily apparent to one skilled in the art in view of this description.

It also should be noted that although the invention has been described in the context of there being three terminals T1, T2, and T3 and three nodes N1, N2, and N3 included in the network 10, more or less than those numbers of terminals and nodes may also be provided, and, as one skilled in the art would appreciate in view of this description, the number of primary and secondary communication links employed in the network 10 and the particular switching arrangements employed in the nodes may be modified as deemed suitable to accommodate those numbers of terminals and nodes.

Moreover, although the invention has been described above in the context of (a) the controllers 84 and 88 being located within the protection modules 56, 56', 56" and 58, 58', 58", respectively, (b) the nodes N1, N2, and N3 including the OLTs 32 and 34, and (c) the protection modules 56, 56', 56", 58, 58', and 58" being external to the OLTs 32, 34, the invention is not limited to only such configurations. By example, in other embodiments the controllers 84, 88 may be located in other portions of the respective nodes, the nodes N1, N2, and N3 each may comprise an optical add/drop multiplexer instead of the OLTs 32, 34 (for performing the multiplexing and demultiplexing operations carried out by OLTs 32 and 34), and/or the protection modules 56, 56', 56" and 58, 58', 58" may be integral portions of the OLTs 32 and 34, respectively (or of the add/drop multiplexers/demultiplexers). Also, the number and location of the VOAs and transponders in the individual nodes N1, N2, and N3 may differ from those shown in FIGS. 3, 5, and 7, depending on applicable design criteria. For example, the VOA 71' of FIG. 5 may be interposed between the switch 94 and amplifier 42, and the VOA 81' may be interposed between the switch 102 and amplifier 52, rather than as shown in FIG. 5, and a similar arrangement also may be provided in the embodiment of FIG. 7. Also by example, in other embodiments, only a single transponder 44 or 54 need be employed in the nodes, depending on whether traffic is being forwarded to and from only one of the OLTs of the node.

It also should be noted that, as pointed out above, the control operations employed in the embodiments of this invention may be performed such that the controller of each node automatically notifies other selected nodes when a link failure/restoration is detected in a link coupled to that node, and so that the controllers of those nodes which receive the notification signal switch to other suitable link(s) in response to either the receipt of that notification signal or the detection within those nodes themselves of the link failure/restoration, whichever occurs first. That is, the controller of each node may be programmed to operate by configuring switches in response to receiving a either notification signal from a monitor block within the same node, a notification signal from another node, or both.

Also, it should be noted that although the invention is described in the context of the various switches being configured in response to either a detection being made by a monitor block 86, 90, a signal being received from another node, or both, those switches may be configured in response to other suitable triggering events. As an example, it also is within the scope of this invention to configure the switches in response to a user entering configuration command information into one or more of the controllers 84, 88, using a suitable user interface (not shown). It is also within the scope of this invention to employ the optical sensors (monitor blocks) outside of one or more of the nodes N1, N2, N3 for detecting failures in, for example, the various links, or to include sensor(s) in only selected ones of the nodes.

The foregoing embodiments of the invention provide protection against component failures in the network 10, without requiring the use of extra, cost-(and noise) contributing amplifiers in the protection communication paths (although, if desired, such amplifiers may be used in the various embodiments of the invention to compensate for any low signal losses that may occur in the nodes.) Also, because the protection communication paths are included in the individual nodes N1, N2, and N3 (e.g., paths 64 and 66), any signal bandwidth reduction and overall signal losses that may occur during a backup switching arrangement are minimized (e.g., for a case in which two switches and connectors are employed, protection losses are less than 3 dB, and during a "loopback" protection configuration in which 1×3 switches are used, an additional 1 dB loss may occur, resulting in there being a loss of 2(X+1) dB in a ring network comprising X nodes). Moreover, since protection switching is performed within nodes that are adjacent to failed communication links, and switches within other nodes of the network remain in a passthrough configuration during such switching operations, it is not necessary to perform any switching control operations in the passthrough nodes during such failures. Furthermore, the optical ring network 10 provides a more economical solution to the problem of protecting against network component failures than is provided by, for example, diverse point-to-point (1+1 or 1:1) facility protection systems, since the ring network itself provides diverse routing.

In other embodiments of this invention, and where desired, suitable types of switches and switching arrangements may also be employed to provide global node coordination to enable extra or low priority signal traffic to be supported by the protection communication paths during normal network operating conditions (e.g., during times when there are no component failures). The inclusion of low priority traffic on the protection path may require switching actions at node(s) that are non-adjacent to the node in which a failure occurs. Sufficient information to support such actions is readily available from controllers and monitors detecting failures.

It also is within the scope of this invention to employ one or more "mini-nodes" coupled in the communication paths between nodes N1, N2, and N3. For example, such mini-nodes preferably comprise optical sensors for detecting link failures, a controller for notifying appropriate ones of the nodes N1, N2, and N3, of those failures, and switches which operate under the control of the controller for switching over to non-failed links in response to the detected failure(s). Such mini-nodes advantageously can identify which side of the mini-nodes the link failures occur in, for notifying the nodes N1, N2, and N3 thereof, and are especially useful in cases in which links spanning between adjacent nodes N1, N2, and N3 are especially long.

While the invention has been particularly shown and described with respect to preferred embodiments thereof, it will be understood by those skilled in the art that changes in form and details may be made therein without departing from the scope and spirit of the invention.

What is claimed is:

1. A communication network, comprising:
   a plurality of nodes, adjacent ones of said nodes being coupled together through first optical fibers that form first communication paths and second optical fibers that form second communication paths, each node comprising:
   a plurality of switches, including a first switch and a second switch, each having at least one first terminal that includes an input and an output, at least one second terminal that includes an input and an output, at least one third terminal, and at least one fourth terminal, wherein the input and output of the first terminal of said first switch are coupled through first and second ones of the first optical fibers forming first communication paths, and the input and output of the second terminal of said first switch are coupled through third and fourth ones of the second optical fibers forming second communication paths, to a first, adjacent one of the nodes, the input and output of the first terminal of said second switch are coupled through first and second ones of other first optical fibers forming other first communication paths, and the input and output of the second terminal of said second switch are coupled through third and fourth ones of the other second optical fibers forming other second communication paths, to a second, adjacent one of the nodes, and the third terminal of said first switch is coupled to the third terminal of said second switch through at least one third communication path;
   at least one multiplexing/demultiplexing device bidirectionally coupled to each of an external communication node and the fourth terminal of each first and second switch, said at least one multiplexing/demultiplexing device for forwarding signals being communicated between the fourth terminals of said first and second switches, and for forwarding signals being communicated between the external communication node and the fourth terminal of respective ones of said first and second switches; and
   at least one controller coupled to said first and second switches, said at least one controller being responsive to applied input information for controlling at least one of said first and second switches to cause that at least one switch to selectively couple at least one of (a) the first and second adjacent nodes together by way of at least one of the first and second communication paths coupled to that at least one switch, and (b) the external communication node and at least one of the first and second, adjacent nodes by way of at least one of the first and second communication paths coupled to that at least one switch,
   wherein the first switch and the second switch are each N×N switches, where N is at least 4, each first communication path is a working path, each second communication path is a protect path, an end of each first optical fiber and an end of each second optical fiber is attached to the first switch, an end of each other first optical fiber and an end of each other second optical fiber is attached to the second switch, and the first optical fibers, the second optical fibers, the other first optical fibers, and the other second optical fibers, are each, at least in part, external to the node.

2. A communication network as set forth in claim 1, wherein said at least one multiplexing/demultiplexing device is a Wavelength- Division-Multiplexed (WDM) device.

3. A communication network as set forth in claim 1, wherein said at least one multiplexing/demultiplexing device includes at least one add/drop multiplexer/demultiplexer.

4. A communication network as set forth in claim 1, wherein the first terminal of each of said first and second switches is normally coupled within the switch to the fourth terminal of that switch and the second terminal of each of said first and second switches is normally coupled within the switch to the third terminal of that switch, and wherein said at least one controller is responsive to applied input information indicating that a failure has occurred in a first communication path for controlling at least one of said first and second switches to cause the first terminal of that at least one switch to be coupled to the third terminal of that switch, and to cause the second terminal of that at least one switch to be coupled to the fourth terminal of that switch, for coupling the at least one second communication path coupled to that second terminal to said at least one multiplexing/demultiplexing device.

5. A communication network as set forth in claim 4, wherein said at least one controller is responsive to further applied input information for controlling the at least one of said first and second switches to cause the first terminal of that at least one switch to be coupled to the fourth terminal of that switch, and to cause the second terminal of that at least one switch to be coupled to the third terminal of that switch, for coupling at least one of the first communication paths coupled to that first terminal to said at least one multiplexing/demultiplexing device.

6. A communication network as set forth in claim 1, wherein said at least one controller is responsive to applied input information indicating that a failure has occurred in at least one of said first and second communication paths for controlling one of said first and second switches of said node to cause the third terminal of that switch to be coupled to the fourth terminal of that switch, for coupling said multiplexing/demultiplexing device through that switch, the third communication path, and the other switch of said node, to the second communication path coupled to that other switch.

7. A communication network as set forth in claim 1, wherein each node further comprises at least one monitor, coupled to said at least one controller, for detecting the occurrence of a failure in at least one of said first and second communication paths, and wherein said at least one monitor responds to detecting a failure in that at least one communication path by applying the input information to said at least one controller.

8. A communication network as set forth in claim 7, wherein said at least one monitor detects the occurrence of a failure in the at least one communication path by detecting the substantial absence of light in that path.

9. A communication network as set forth in claim 7, wherein said at least one controller is coupled to at least one of the other nodes of the communication network through at least one of said first and second communication paths, and wherein said at least one controller is responsive to the input information being applied thereto by the at least one monitor for notifying the at least one other node of the detected failure by way of that at least one communication path.

10. A communication network as set forth in claim 7, wherein said at least one controller is coupled to at least one of the other nodes of the communication network through at least one of said first and second communication paths, and wherein the input information applied to the at least one controller is provided from the at least one other node by way of that at least one communication path.

11. A communication network as set forth in claim 7, wherein said plurality of nodes are coupled together through said first and second communication paths, and form a loop configuration.

12. A communication network, comprising:
a plurality of first communication paths;
a plurality of second communication paths; and
a plurality of nodes, adjacent ones of said nodes being coupled together through said first communication paths and said second communication paths, each node comprising:
a plurality of switches, including a first switch and a second switch, each having at least one first terminal, at least one second terminal, at least one third terminal, and at least one fourth terminal, wherein the first terminal and the second terminal of said first switch are coupled through plural first communication paths and plural second communication paths, respectively, to a first, adjacent one of the nodes, the first terminal and the second terminal of said second switch are coupled through plural other first communication paths and plural other second communication paths, respectively, to a second, adjacent one of the nodes, and the third terminal of said first switch is coupled to the third terminal of said second switch through at least one third communication path;
at least one multiplexing/demultiplexing device bidirectionally coupled to each of an external communication node and the fourth terminal of each first and second switch, said at least one multiplexing/demultiplexing device for forwarding signals being communicated between the fourth terminals of said first and second switches, and for forwarding signals being communicated between the external communication node and the fourth terminal of respective ones of said first and second switches; and
at least one controller coupled to said first and second switches, said at least one controller being responsive to applied input information for controlling at least one of said first and second switches to cause that at least one switch to selectively couple at least one of (a) the first and second adjacent nodes together by way of at least one of the first and second communication paths coupled to that at least one switch, and (b) the external communication node and at least one of the first and second, adjacent nodes by way of at least one of the first and second communication paths coupled to that at least one switch,
wherein each first communication path is a working path and each second communication path is a protect path,
wherein said at least one multiplexing/demultiplexing device comprises
a plurality of multiplexers, a first one of said multiplexers having a first input coupled to a first output of said external communication node, and an output coupled to the fourth terminal of said first switch, a second one of said multiplexers having a first input coupled to a second output of the external communication node, and an output coupled to the fourth terminal of said second switch, and
a plurality of demultiplexers, a first one of said demultiplexers having a first input coupled to the fourth terminal of said first switch, a first output coupled to a first input of the external communication node, and a second output coupled to a second input of said second multiplexer, a second one of said demultiplexers having a first input coupled to the fourth terminal of said second switch, a first output coupled to a second input of the external communication node, and a second output coupled to a second input of said first multiplexer, and
wherein each of said first and second multiplexers couples individual signals received through the first and second inputs thereof to the output of that multiplexer, and each of said first and second demultiplexers couples signals applied to the input thereof to corresponding ones of the first and second outputs of that demultiplexer.

13. A communication network as set forth in claim 12, wherein each node further comprises:
at least one first transponder interposed between both said first multiplexer and the external communication node and between said first demultiplexer and the external communication node, said at least one first transponder having a first input coupled to the first output of the external communication node, a second input coupled to the first output of said first demultiplexer, a first output coupled to the first input of said first multiplexer, and a second output coupled to the first input of the external communication node; and
at least one second transponder interposed between both said second multiplexer and the external communication node and between said second demultiplexer and the external communication node, said at least one second transponder having a first input coupled to the second output of the external communication node, a second input coupled to the first output of said second demultiplexer, a first output coupled to the first input of said second multiplexer, and a second output coupled to the second input of the external communication node.

14. A communication network as set forth in claim 13, further comprising:
a first amplifier interposed between the output of said first multiplexer and the fourth terminal of said first switch;
a second amplifier interposed between the fourth terminal of said first switch and the input of said first demultiplexer;
a third amplifier interposed between the output of said second multiplexer and the fourth terminal of said second switch; and
a fourth amplifier interposed between the fourth terminal of said second switch and the input of said second demultiplexer.

15. A communication network as set forth in claim 12, further comprising:
a first variable optical attenuator interposed between the fourth terminal of said first switch and the input of said first demultiplexer; and
a second variable optical attenuator interposed between the fourth terminal of said second switch and the input of said second demultiplexer.

16. A communication network as set forth in claim 12, wherein said first multiplexer and said first demultiplexer are both included within a first optical line terminal, and wherein said second multiplexer and said second demultiplexer are both included within a second optical line terminal.

17. A node operating in a communication network having a plurality of nodes that are coupled together through first and second communication paths, said node comprising:
a first switch having at least a first terminal that includes an input and an output coupled to a first adjacent one of the nodes through first and second ones, respectively, of first optical fibers forming the first communication paths, and also having at least a second terminal that includes an input and an output coupled to the first adjacent node through third and fourth ones, respectively, of second optical fibers forming the second communication paths, said first switch also having a third terminal and a fourth terminal;
a second switch having at least a first terminal that includes an input and an output coupled to a second adjacent one of the nodes through first and second ones, respectively, of other first optical fibers forming other first communication paths, at least a second terminal that includes an input and an output coupled to that second adjacent node through third and fourth ones, respectively, of other second optical fibers forming other second communication paths, a third terminal, and a fourth terminal, wherein the third terminal of said second switch is coupled to the third terminal of said first switch through at least one third communication path;
at least one multiplexing/demultiplexing device bidirectionally coupled to each of an external communication node and the fourth terminal of each first and second switch, said at least one multiplexing/demultiplexing device for forwarding signals being communicated between the fourth terminals of said first and second switches, and for forwarding signals being communicated between the external communication node and the fourth terminal of respective ones of said first and second switches; and
at least one controller coupled to said first and second switches, said at least one controller being responsive to applied input information for controlling at least one of said first and second switches to cause that at least one switch to selectively couple at least one of (a) the first and second adjacent nodes together by way of at least one of the first and second communication paths, and (b) the external communication node and at least one of the first and second adjacent nodes by way of at least one of the first and second communication paths coupled to that at least one switch,
wherein each first and second switch is a N×N switch, where N is at least 4, each first communication path is a working path, each second communication path is a protect path, the plural first optical fibers and the plural second optical fibers extend between the first switch and the first adjacent node, the plural other first optical fibers and the plural other second optical fibers extend between the second switch and the second adjacent node, an end of each first optical fiber and an end of each second optical fiber is attached to the first switch, and an end of each other first optical fiber and an end of each other second optical fiber is attached to the second switch.

18. A node as set forth in claim 17, wherein said at least one multiplexing/demultiplexing device is a Wavelength-Division-Multiplexed (WDM) device.

19. A node as set forth in claim 17, wherein the first terminal of each of said first and second switches is normally coupled in the switch to the fourth terminal of that switch and the second terminal of each of said first and second switches is normally coupled in that switch to the third terminal of that switch, and wherein said at least one controller is responsive to applied input information indicating that a failure has occurred in at least one first communication path for controlling at least one of said first and second switches to cause the first terminal of that at least one switch to be coupled to the third terminal of that switch, and to cause the second terminal of that at least one switch to be coupled to the fourth terminal of that switch, for coupling the at least one second communication path coupled to that second terminal to said at least one multiplexing/demultiplexing device.

20. A node as set forth in claim 17, wherein said at least one controller is responsive to applied input information indicating that a failure has occurred in at least one of said first and second communication paths for controlling one of said first and second switches of said node to cause the third terminal of that switch to be coupled to the fourth terminal of that switch, for coupling said multiplexing/demultiplexing device through that switch, the third communication path, and the other switch of said node, to the second communication path coupled to that other switch.

21. A node as set forth in claim 17, further comprising at least one monitor for detecting the occurrence of a failure in at least one of said first and second communication paths, and wherein said at least one monitor is responsive to detecting a failure in that at least one communication path by applying the input information to said at least one controller.

22. A node as set forth in claim 21, wherein said at least one controller is responsive to the input information applied thereto by the at least one monitor for notifying at least one of said adjacent nodes of the detected failure by way of that communication path.

23. A node as set forth in claim 17, wherein said at least one controller is coupled to at least one of the first and second adjacent nodes through at least one of said first and second communication paths, and wherein the input information applied to the at least one controller is provided from at least one of those nodes by way of that at least one communication path.

24. A node as set forth in claim 20, wherein said at least one controller is responsive to applied input information indicating that the at least one of said first and second communication paths in which the failure occurred has been restored for controlling said one of said first and second switches of said node to cause the first terminal of that switch to be coupled to the fourth terminal of that switch, for coupling said multiplexing/demultiplexing device through that switch to the first communication path coupled to that switch, and to cause the second terminal of that switch to be coupled to the third terminal of that switch.

25. A node, operating in a communication network having a plurality of nodes that are coupled together through first and second communication paths, said node comprising:
a first switch having at least a first terminal that includes an input and an output coupled to a first adjacent one of the nodes through a first optical fiber and a second optical fiber, respectively, forming first communication paths, and at least a second terminal that includes an input and an output coupled to the first adjacent node through a third optical fiber and a fourth optical fiber, respectively, forming second communication paths, said first switch also having a third terminal and a fourth terminal;
a second switch having at least a first terminal that includes an input and an output coupled to a second adjacent one of the nodes through a first optical fiber and a second optical fiber, respectively, forming other first communication paths, at least a second terminal that includes an input and an output coupled to that second adjacent node through a third optical fiber and a fourth optical fiber, respectively, forming other second communication paths, a third terminal, and a fourth terminal, wherein the third terminal of said second switch is coupled to the third terminal of said first switch through at least one third communication path;

at least one multiplexing/demultiplexing device bidirectionally coupled to each of an external communication node and the fourth terminal of each first and second switch, said at least one multiplexing/demultiplexing device for forwarding signals being communicated between the fourth terminals of said first and second switches, and for forwarding signals being communicated between the external communication node and the fourth terminal of respective ones of said first and second switches; and at least one controller coupled to said first and second switches, said at least one controller being responsive to applied input information for controlling at least one of said first and second switches to cause that at least one switch to selectively couple at least one of (a) the first and second adjacent nodes together by way of at least one of the first and second communication paths, and (b) the external communication node and at least one of the first and second adjacent nodes by way of at least one of the first and second communication paths coupled to that at least one switch, wherein each first and second switch is a N×N switch, where N is at least 4, and each first communication path is a working path and each second communication path is a protect path, wherein said at least one multiplexing/demultiplexing device comprises a plurality of multiplexers, a first one of said multiplexers having a first input coupled to a first output of said external communication node, and an output coupled to the fourth terminal of said first switch, a second one of said multiplexers having a first input coupled to a second output of the external communication node, and an output coupled to the fourth terminal of said second switch, and a plurality of demultiplexers, a first one of said demultiplexers having an input coupled to the fourth terminal of said first switch, a first output coupled to a first input of the external communication node, and a second output coupled to a second input of said second multiplexer, a second one of said demultiplexers having a first input coupled to the fourth terminal of said second switch, a first output coupled to a second input of the external communication node, and a second output coupled to a second input of said first multiplexer, and wherein each of said first and second multiplexers couples individual signals received through the first and second inputs thereof to the output of that multiplexer, and each of said first and second demultiplexers couples signals applied to the input thereof to corresponding ones of the first and second outputs of that demultiplexer.

26. A communication network, comprising:
plural first optical fibers and plural second optical fibers forming at least one communication path;
a plurality of nodes coupled in said at least one communication path, each node comprising:
at least one multiplexer/demultiplexer device coupled to a corresponding external terminal, and
a plurality of separate N×N switches, where N is at least 4, said switches being controllable for selectively coupling signals between said multiplexer/demultiplexer device and said at least one communication path, and for selectively coupling signals through said node to and from said at least one communication path, without forwarding those signals through said multiplexer/demultiplexer device, wherein the plural first optical fibers form at least two working paths and the plural second optical fibers form at least two protect paths, a first input and a first output at least one of the switches of at least one of the nodes are coupled to at least one of the switches of at least one other of the nodes through first and second ones, respectively, of the plural first optical fibers, a second input and a second output of the at least one switch of the at least one node are coupled to the at least one of the switches of the at least one other node through third and fourth ones, respectively, of the plural second optical fibers extend, at least in part, externally to at least one of the nodes, each of the first, second, third, and fourth optical fibers having an end attached to the at least one switch of one of those nodes.

27. A communication network as set forth in claim 26, wherein each node also comprises at least one controller, said at least one controller of at least one of said nodes is responsive to applied input information indicating that a failure has occurred in at least one of the communication paths for controlling at least one of said switches of that node to enable signals to be exchanged between at least one other, selected one of the communication paths and the multiplexing/demultiplexing device of that node by way of that at least one switch.

28. A communication network as set forth in claim 27, wherein in a case in which the switches in first and second ones of the nodes are controlled for enabling signals to be exchanged with the at least one other, selected communication path, those signals also are exchanged between those first and second nodes by way of that at least one other, selected communication path.

29. A communication network as set forth in claim 28, wherein a third one of the nodes is interposed in the at least one communication path between one side of the first node and one side of the second node, and wherein said controller of the first node controls at least one of said switches of the first node and said controller of the second node controls at least one of said switches of the second node to provide a loopback switching arrangement for enabling signals to be exchanged between the first and second nodes through the third node.

30. A communication network as set forth in claim 26, wherein said multiplexer/demultiplexer device is a Wavelength-Division-Multiplexed (WDM) device.

31. A communication network as set forth in claim 26, wherein each node also comprises at least one amplifier coupled between said multiplexer/demultiplexer device and at least one of said switches.

32. A communication network as set forth in claim 31, wherein each node also comprises at least one variable optical attenuator interposed between the at least one of said switches and said amplifier.

33. A line node, comprising:
at least one controller;
at least one multiplexing/demultiplexing device coupled to an external terminal; and
a plurality of separate N×N switches, controllable by said at least one controller, for selectively coupling signals between said at least one multiplexing/demultiplexing device and plural first optical fibers and plural second optical fibers forming at least one external communication path, and for selectively coupling signals through said line node to and from the at least one external communication path, without forwarding those signals through said at least one multiplexing/demultiplexing device, where N is at least 4, wherein the plural first optical fibers form at least two working communication paths and the plural second optical fibers form at least two protect communication paths, a first input and a first output at least one of the switches are coupled to ends of a first and second one, respectively, of the plural first optical fibers, and a second input and a second output of the at least one switch are coupled to ends of a third one and fourth one, respectively, of the plural second optical fibers, and the plural first optical fibers and the plural second optical fibers are external to said line node.

34. A line node as set forth in claim 33, wherein said multiplexing/demultiplexing device is a Wavelength-Division-Multiplexed (WDM) device.

35. A line node as set forth in claim 33, further comprising at least one amplifier coupled between said multiplexing/demultiplexing device and at least one of said switches.

36. A line node as set forth in claim 35, further comprising at least one variable optical attenuator interposed between the at least one of said switches and said amplifier.

37. A method for operating a communication network that includes a plurality of nodes coupled together through plural first optical fibers and plural second optical fibers forming communication paths, the nodes exchanging signals with one another through at least one of the communication paths, the method comprising:

detecting a failure in at least one of the communication paths; and in response to the detecting, controlling at least one of a plurality of separate N×N switches in at least one of the nodes to enable the signals to be exchanged between at least two of the nodes through at least one other of the communication paths, where N is at least 4, wherein the plural first optical fibers form at least two working communication paths and the plural second optical fibers form at least two protect communication paths, a first input and a first output of at least one of the switches of the at least one node are coupled to at least one of the switches of at least one other of the nodes through a first one and a second one, respectively, of the plural first optical fibers, and a second input and a second output of the at least one switch of the at least one node are coupled to the at least one switch of the at least one other node through a third one and a fourth one, respectively, of the plural second optical fibers, and the plural first optical fibers and the plural second optical fibers are external to the at least one node and each have an end attached to the at least one switch of the at least one node.

38. A method as set forth in claim 37, further comprising the step of multiplexing at least some of the signals within at least one of the nodes.

39. A method as set forth in claim 37, further comprising the step of demultiplexing at least some of the signals within at least one of the nodes.

40. A method as set forth in claim 37, wherein the controlling step is performed to loopback signals from a first node to a second node through a third node interposed between the first and second nodes.

41. A method as set forth in claim 37, wherein the nodes and the at least one communication path collectively form a loop configuration.

42. A method as set forth in claim 37, wherein the detecting includes:

at a first one of the nodes, detecting a failure in a first one of the communication paths, and communicating a first failure notification to a second, adjacent one of the nodes through at least a third one of the communication paths coupled to those first and second nodes; and at the second, adjacent node, detecting a failure in a second one of the communication paths, and communicating a second failure notification to the first node through the at least third one of the communication paths, and wherein the controlling step includes:

in response to the first node receiving the second failure notification, controlling at least one of a plurality of switches in the first node to enable the signals to be exchanged between the first node and the at least one other of the communication paths; and in response to the second node receiving the first failure notification, controlling at least one of a plurality of switches in the second node to enable the signals to be exchanged between the first and second nodes through the at least one other communication path.

43. A method as set forth in claim 37, further comprising:

detecting removal of the failure in the at least one of the communication paths; and controlling the at least one of the plurality of separate N×N switches in the at least one of the nodes to enable the signals to be exchanged between the at least two nodes through the at least one communication path.

44. A method for operating a line node of a communication network, the line node being coupled to an external communication terminal and also being coupled to at least one other line node through plural first optical fibers and plural second optical fibers forming a plurality of communication paths, the method comprising:

detecting a failure in at least one of the communication paths; and in response to the detecting, controlling at least one of a plurality of separate N×N switches in the line node to cause that at least one switch to selectively couple signals between the external communication terminal and at least one other of the communication paths coupled to the line node, for enabling those signals to be selectively communicated between the external terminal and at least one other line node of the communication network, where N is at least 4, wherein the plural first optical fibers form working communication paths and the plural second optical fibers form protect communication paths, a first input and a first output of at least one of the switches is coupled to an end of a first one and a second one, respectively, of the plural first optical fibers, and a second input and a second output of the at least one switch is coupled to an end of a third one and a fourth one, respectively, of the plural second optical fibers, and the plural first optical fibers and the plural second optical fibers are external to the line node.

45. A method as set forth in claim 44, wherein the line node comprises a multiplexing/demultiplexing device interposed between the external communication device and the plurality of switches.

46. A method as set forth in claim 44, further comprising: detecting removal of the failure in the at least one of the communication paths; and controlling the at least one of the plurality of separate N×N switches in the line node to enable the signals to be communicated between the external communication terminal and the at least one other line node through the at least one communication path.

47. A computer readable storage medium storing a program which, when executed, performs a method for operating a line node of a communication network, the line node being coupled to an external terminal and also being coupled to at least one other line node through plural first optical fibers and plural second optical fibers forming a plurality of communication paths, the method comprising:

detecting a failure in at least one of the communication paths; and in response to the detecting, controlling at least one of a plurality of separate N×N switches in the line node to cause that at least one switch to selectively couple signals between the external terminal and at least one other of the communication paths coupled to the line node, for enabling those signals to be selectively communicated between the external terminal and at least one other line node of the communication network, where N is at least 4, wherein the plural first optical fibers form working communication paths and the plural second optical fibers form protect communication paths, a first input and a first output of at least one of the switches is coupled to an end of a first one and a second one, respectively, of the plural first optical fibers, and a second input and a second output of the at least one switch is coupled to an end of a third one and a fourth one, respectively, of the plural second optical fibers, and the plural first optical fibers and the plural second optical fibers are external to the line node.

48. A computer readable storage medium as set forth in claim 47, wherein the method further comprises:

detecting removal of the failure in the at least one of the communication paths; and controlling the at least one of the plurality of separate N×N switches in the line node to enable the signals to be communicated between the external communication terminal and the at least one other line node through the at least one communication path.

49. A computer readable storage medium as set forth in claim 47, wherein the method further comprises notifying the at least one other line node of the failure detected in the detecting.

* * * * *